(12) United States Patent
Kajiwara

(10) Patent No.: US 7,903,734 B2
(45) Date of Patent: Mar. 8, 2011

(54) MOVING IMAGE DECODING APPARATUS, MOVING IMAGE DECODING METHOD, IMAGE DECODING METHOD, AND IMAGE DECODING APPARATUS

(75) Inventor: Hiroshi Kajiwara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1209 days.

(21) Appl. No.: 10/823,612

(22) Filed: Apr. 14, 2004

(65) Prior Publication Data

US 2004/0213347 A1     Oct. 28, 2004

(30) Foreign Application Priority Data

| Apr. 24, 2003 | (JP) | 2003-120501 |
| Aug. 19, 2003 | (JP) | 2003-295528 |
| Feb. 26, 2004 | (JP) | 2004-052126 |
| Mar. 15, 2004 | (JP) | 2004-073404 |

(51) Int. Cl.
  H04B 1/66   (2006.01)
  H04N 7/12   (2006.01)
  H04N 11/02  (2006.01)
  H04N 11/04  (2006.01)

(52) U.S. Cl. .............. 375/240.11; 375/240.25

(58) Field of Classification Search ........... 375/240.11, 375/240.25
  See application file for complete search history.

(56) References Cited

U.S. PATENT DOCUMENTS

| 5,838,823 | A | * | 11/1998 | Ancessi | 382/232 |
| 5,945,930 | A | | 8/1999 | Kajiwara | 341/50 |
| 6,028,963 | A | | 2/2000 | Kajiwara | 382/239 |
| 6,031,938 | A | | 2/2000 | Kajiwara | 382/239 |
| 6,101,282 | A | | 8/2000 | Hirabayashi et al. | 382/246 |
| 6,233,355 | B1 | | 5/2001 | Kajiwara | 382/238 |
| 6,310,980 | B1 | | 10/2001 | Kajiwara | 382/238 |
| 6,501,397 | B1 | * | 12/2002 | Radha et al. | 341/60 |
| 6,501,859 | B1 | | 12/2002 | Kajiwara | 382/239 |
| 6,542,641 | B1 | * | 4/2003 | Andrew et al. | 382/233 |
| 6,549,676 | B1 | | 4/2003 | Nakayama et al. | 382/246 |
| 6,560,365 | B1 | | 5/2003 | Nakayama et al. | 382/233 |
| 6,665,444 | B1 | | 12/2003 | Kajiwara | 382/240 |
| 6,711,295 | B2 | | 3/2004 | Nakayama et al. | 382/232 |

(Continued)

FOREIGN PATENT DOCUMENTS

JP    11-288307    10/1999

(Continued)

*Primary Examiner* — Marsha D Banks Harold
*Assistant Examiner* — Jessica Prince
(74) *Attorney, Agent, or Firm* — Fitzpatrick, Cella, Harper & Scinto

(57) ABSTRACT

A moving image decoding apparatus for decoding encoded moving image data, which is generated by decomposing each frame of moving image data into a plurality of subbands, and bitplane-encoding coefficients of the subbands for each predetermined unit, includes a decoding process time measurement unit (105) for acquiring information used to examine a difference of a time required for the decoding process of encoded moving image data for the predetermined unit, a non-decoding bitplane determination unit (107) for determining bitplanes which are not to be decoded on the basis of the obtained information, a bitplane decoder for reclaiming the coefficients of the subbands from encoded data of bitplanes other than the non-decoding bitplanes, and an inverse discrete wavelet transformer (104) for generating frame data by compositing the reclaimed coefficients of the subbands.

6 Claims, 26 Drawing Sheets

U.S. PATENT DOCUMENTS

| | | | |
|---|---|---|---|
| 6,751,356 B2 * | 6/2004 | Oki | 382/240 |
| 6,947,600 B1 | 9/2005 | Sato et al. | 382/233 |
| 6,985,632 B2 * | 1/2006 | Sato et al. | 382/240 |
| 7,136,532 B2 * | 11/2006 | Van Der Schaar | 382/233 |
| 2001/0028747 A1 | 10/2001 | Sato et al. | 382/239 |
| 2001/0028748 A1 | 10/2001 | Sato et al. | 382/239 |
| 2001/0031094 A1 | 10/2001 | Yamazaki et al. | 382/240 |
| 2002/0061140 A1 | 5/2002 | Kajiwara | 382/233 |
| 2003/0007561 A1 | 1/2003 | Kajiwara | 375/240.11 |
| 2003/0063811 A1 | 4/2003 | Kajiwara | 382/240 |
| 2004/0001635 A1 * | 1/2004 | Van Der Schaar | 382/233 |
| 2004/0013312 A1 | 1/2004 | Kajiwara | 382/240 |

FOREIGN PATENT DOCUMENTS

| | | |
|---|---|---|
| JP | 2001-112004 | 4/2001 |

* cited by examiner

FIG. 8

| SUBBAND / Q FACTOR | 0 | 1 | 2 | 3 | 4 | 5 | 6 | 7 | 8 | 9 |
|---|---|---|---|---|---|---|---|---|---|---|
| HH2 | 0 | 1 | 2 | 3 | 4 | 5 | 5 | 6 | 6 | 6 |
| HL2(LH2) | 0 | 1 | 2 | 3 | 4 | 5 | 5 | 6 | 6 | 6 |
| HH1 | 0 | 1 | 2 | 3 | 4 | 5 | 5 | 6 | 6 | 6 |
| HL(LH1) | 0 | 0 | 1 | 2 | 3 | 3 | 4 | 4 | 5 | 5 |
| LL | 0 | 0 | 0 | 0 | 1 | 1 | 2 | 2 | 2 | 3 |

FIG. 11

| SUBBAND Sb | NON-DECODING BITPLANE NUMBER ND(Sb) |
|---|---|
| HH2 | 1 |
| LH2 | 1 |
| HL2 | 1 |
| HH1 | 1 |
| LH1 | 0 |
| HL1 | 0 |
| LL | 0 |

FIG. 14

| SUBBAND INDEX SI | SUBBAND Sb |
|---|---|
| 0 | HH2 |
| 1 | LH2 |
| 2 | HL2 |
| 3 | HH1 |
| 4 | LH1 |
| 5 | HL1 |
| 6 | LL |

FIG. 20

| Q FACTOR<br>Q | REQUIRED DECODING TIME<br>D't(Q) |
|---|---|
| 0 | D't(0) |
| 1 | D't(1) |
| 2 | D't(2) |
| 3 | D't(3) |
| 4 | D't(4) |
| 5 | D't(5) |
| 6 | D't(6) |
| 7 | D't(7) |
| 8 | D't(8) |
| 9 | D't(9) |

FIG. 22

| SUBBAND INDEX<br>SI | SUBBAND<br>Sb | REQUIRED DECODING TIME<br>Dt(SI) |
|---|---|---|
| 0 | HH2 | Dt(0) |
| 1 | LH2 | Dt(1) |
| 2 | HL2 | Dt(2) |
| 3 | HH1 | Dt(3) |
| 4 | LH1 | Dt(4) |
| 5 | HL1 | Dt(5) |
| 6 | LL | Dt(6) |

FIG. 23

| SUBBAND Sb | DECODING FRAME F(Sb) |
|---|---|
| HH2 | 0 |
| LH2 | 0 |
| HL2 | 0 |
| HH1 | 1 |
| LH1 | 1 |
| HL1 | 1 |
| LL | 1 |

MOVING IMAGE DECODING APPARATUS, MOVING IMAGE DECODING METHOD, IMAGE DECODING METHOD, AND IMAGE DECODING APPARATUS

FIELD OF THE INVENTION

The present invention relates to a technique for reclaiming a playback image by decoding all or some frames of moving image data, frames of which are independently encoded.

BACKGROUND OF THE INVENTION

In general, moving image data encoding methods are roughly classified based on whether or not to use inter-frame correlation. Those methods have merits and demerits, and which of methods is suitable depends on an application used. For example, Motion JPEG is a method of independently encoding each frame of moving image data as a single still image, and is an example of an encoding method that does not use any inter-frame correlation. As merits, this method allows easy moving image edit processes such as a division process, coupling process, partial rewrite process, and the like of moving images, and allows to select and decode frames to be decoded in accordance with the processing performance on the decoding side, since frames are independently encoded.

In recent years, of the encoding methods that independently encode moving image data for respective frames, a method of encoding each frame by combining wavelet transformation and bitplane encoding has received a lot of attention. Such moving image encoding method has outstanding features: it allows decoding by changing the spatial resolution step by step by exploiting a subband decomposition scheme in wavelet transformation, and can change the decoding pixel precision step by step by changing the number of bitplanes to be decoded.

JPEG2000 (ISO/IEC 15444) as an image encoding method that has been standardized by ISO/IEC JTC/SC29/WG1 is specified by a combination of wavelet transformation and bitplane encoding. Part 3 of that standard specifies a file format as Motion JPEG2000 upon applying JPEG2000 to encoding of respective frames of a moving image.

Such moving image encoding methods represented by Motion JPEG2000 have merits such as flexibility in decoding resolution and decoding pixel precision, as described above, but have demerits such as a heavy load on an encoding/decoding process by bitplane encoding. Especially, when a video recorded by a dedicated moving image recording device is to be played back by a personal computer, all data cannot often be decoded and displayed in real time depending on the performance of the computer.

To solve such problem, methods that determine a decoding process time required to decode each frame, assign the decoding process time for respective encoding process units, and decode respective bitplanes within the assigned decoding process time have been disclosed (e.g., Japanese Patent Laid-Open Nos. 11-288307 and 2001-112004).

However, with a moving image decoding apparatus which aborts a decoding process after an elapse of a predetermined time, as disclosed in Japanese Patent Laid-Open Nos. 11-288307, 2001-112004, and the like, since the decoding process abort points (the number of decoded bitplanes) readily vary for respective frames, a change in distortion pattern over time occurs upon playing back a moving image, and appears as flickering, thus causing visual disturbance.

SUMMARY OF THE INVENTION

The present invention has been made in consideration of the aforementioned problems, and has as its object to provide a technique that can efficiently decode all or some frames of encoded moving image data in correspondence with the processing performance of a moving image decoding apparatus, and can obtain high playback image quality with less visual disturbance.

In order to achieve the above object, for example, a moving image decoding method of the present invention comprises the following arrangement.

That is, a moving image decoding method of decoding encoded moving image data, which is generated by decomposing each frame of moving image data into a plurality of subbands, and encoding coefficients of the subbands from upper to lower bits for respective bitplanes or sub-bitplanes for each predetermined unit, comprising:

a decoding process time information acquisition step of acquiring information used to examine a difference between a time assigned to a decoding process of encoded moving image data for the predetermined unit, and a time required for an actual decoding process;

a non-decoding bitplane determination step of determining bitplanes or sub-bitplanes which are not to be decoded on the basis of the information acquired in the decoding process time information acquisition step;

a bitplane decoding step of reclaiming the coefficients of the subbands from encoded data of bitplanes or sub-bitplanes other than the bitplanes or sub-bitplanes determined in the non-decoding bitplane determination step; and a subband composition step of generating frame data by compositing the coefficients of the plurality of subbands obtained in the bitplane decoding step.

In order to achieve the above object, for example, a moving image decoding apparatus of the present invention comprises the following arrangement.

That is, a moving image decoding apparatus for decoding encoded moving image data, which is generated by decomposing each frame of moving image data into a plurality of subbands, and encoding coefficients of the subbands from upper to lower bits for respective bitplanes or sub-bitplanes for each predetermined unit, comprising:

decoding process time information acquisition means for acquiring information used to examine a difference between a time assigned to a decoding process of encoded moving image data for the predetermined unit, and a time required for an actual decoding process;

non-decoding bitplane determination means for determining bitplanes or sub-bitplanes which are not to be decoded on the basis of the information acquired by said decoding process time information acquisition means;

bitplane decoding means for reclaiming the coefficients of the subbands from encoded data of bitplanes or sub-bitplanes other than the bitplanes or sub-bitplanes determined by said non-decoding bitplane determination means; and subband composition means for generating frame data by compositing the coefficients of the plurality of subbands obtained by said bitplane decoding means.

In order to achieve the above object, for example, an image decoding method of the present invention comprises the following arrangement.

That is, an image decoding method of receiving moving image data, in which images of respective frames have been encoded, and decoding encoded image data of the respective frames, comprising:

a sample frame decoding step of extracting encoded image data of a sample frame from the respective frames, and decoding the encoded image data using a predetermined decoding unit;

a first measurement step of measuring a time required to decode the encoded image data of the sample frame;

a determination step of determining the number of decoding units to be decoded so that the time measured in the first measurement step becomes not more than a predetermined time;

a decoding step of decoding encoded image data of the respective frames in accordance with the determined number of decoding units;

a second measurement step of measuring a time required to decode each frame upon decoding the frame in the decoding step;

an update step of accumulating a difference between the predetermined time and the time measured in the second measurement step every time the frame is decoded, and updating the number of decoding units determined in the determination step when the accumulated value becomes not less than a predetermined value; and in that the decoding step includes a step of decoding the encoded image data of each frame in accordance with the number of decoding units determined in the determination step or the number of decoding units updated in the update step.

In order to achieve the above object, for example, an image decoding apparatus of the present invention comprises the following arrangement.

That is, an image decoding apparatus for receiving moving image data, in which images of respective frames have been encoded, and decoding encoded image data of the respective frames, comprising:

sample frame decoding means for extracting encoded image data of a sample frame from the respective frames, and decoding the encoded image data using a predetermined decoding unit;

first measurement means for measuring a time required to decode the encoded image data of the sample frame;

determination means for determining the number of decoding units to be decoded so that the time measured by the first measurement means becomes not more than a predetermined time;

decoding means for decoding encoded image data of the respective frames in accordance with the determined number of decoding units;

second measurement means for measuring a time required to decode each frame upon decoding the frame by the decoding means;

update means for accumulating a difference between the predetermined time and the time measured by the second measurement means every time the frame is decoded, and updating the number of decoding units determined by the determination means when the accumulated value becomes not less than a predetermined value; and in that the decoding means decodes the encoded image data of each frame in accordance with the number of decoding units determined by the determination means or the number of decoding units updated by the update means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a table showing the relationship between Q factors and non-decoding bitplanes ND (Sb) of respective subbands or between Q factors and non-decoding pass counts NDP(Sb) of respective subbands;

FIG. 11 shows an example of a table held in a non-decoding bitplane determination unit according to the second embodiment of the present invention;

FIG. 14 is a table showing the correspondence between subband indices SI and subbands according to the second embodiment of the present invention;

FIG. 20 is a table showing sample frame decoding times Dt'(Q) corresponding to Q factor values;

FIG. 22 shows an example of the configuration of a table that shows the relationship between subband indices SI and decoding times (required decoding times) of subbands Sb;

FIG. 23 shows an example of the configuration of a table that shows decoding flags F(Sb) corresponding to respective subbands Sb;

DETAILED DESCRIPTION OF THE PREFERRED EMBODIMENTS

Preferred embodiments of the present invention will now be described in detail in accordance with the accompanying drawings. Note that the dimensions, materials, and shapes of building components, their relative layout, and the like described in the embodiments should be changed as needed depending on the arrangement of an apparatus to which the present invention is applied, and various conditions, and the present invention is not limited to their examples.

<Outline of Encoded Moving Image Data>

Encoded moving image data, which is to be decoded by a moving image decoding apparatus in an embodiment of the present invention, will be described first.

Figure 1:
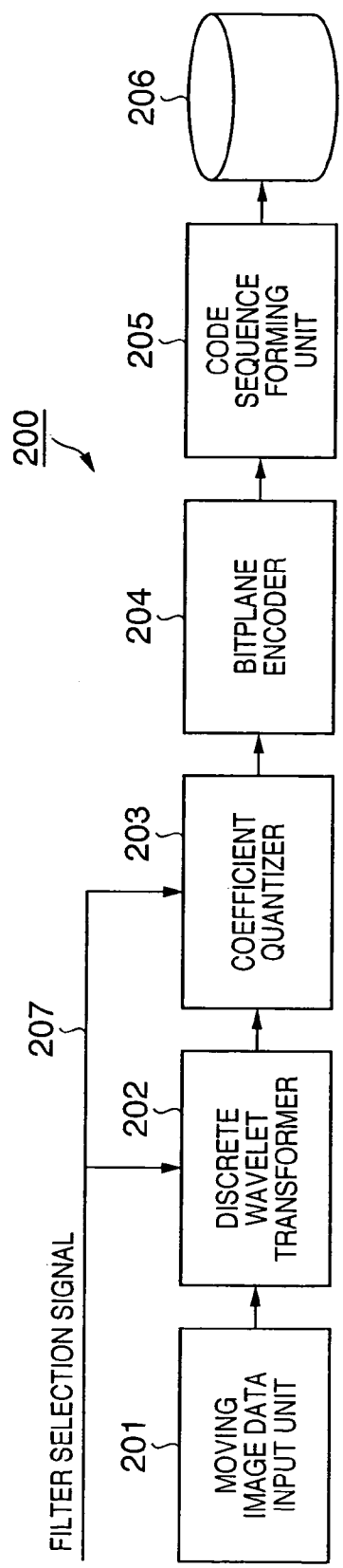
FIG. 1 is a block diagram showing the arrangement of a moving image encoding apparatus in an embodiment of the present invention.

FIG. 1 is a block diagram showing the arrangement of a moving image encoding apparatus 200 which generates encoded moving image data to be decoded by moving image decoding apparatus in an embodiment of the present invention. The moving image encoding apparatus 200 independently encodes frames that form a moving image by an encoding method as a combination of wavelet transformation and bitplane encoding. As shown in FIG. 1, the apparatus 200 comprises a moving image data input unit 201, discrete wavelet transformer 202, coefficient quantizer 203, bitplane encoder 204, code sequence forming unit 205, secondary storage device 206, and signal line 207.

The flow of the encoding process in the moving image encoding apparatus 200 will be explained while explaining the operations of the building components of the moving image encoding apparatus 200 shown in FIG. 1. In the following description, assume that the moving image encoding apparatus 200 fetches and encodes monochrome moving image data (8-bit luminance value/pixel) at a rate of 30 frames/sec for four seconds (a total of 120 frames). That is, the moving image encoding apparatus 200 encodes moving image data at the rate of 30 frames per second input from the moving image data input unit 201 for respective frames, and finally stores encoded data in the secondary storage device 206.

The moving image data input unit 201 inputs moving image data for four seconds at a rate of 30 frames/sec. The moving image data input unit 201 is, for example, an image sensing unit of a digital camera or the like, and can be implemented by an image sensing device such as a CCD or the like, and various image adjustment circuits such as a gamma correction circuit, shading correction circuit, and the like. The moving image data input unit 201 sends the input moving image data to the discrete wavelet transformer 202 frame by frame. In the following description, numbers are assigned to frame data in turn from 1 in the order they are input, and respective frames are identified by numbers like frame 1, frame 2, . . . . Also, x represents the horizontal pixel position (coordinate) in each frame, y represents the vertical pixel position, and P(x, y) represents a pixel value at the pixel position (x, y).

Figure 2C:
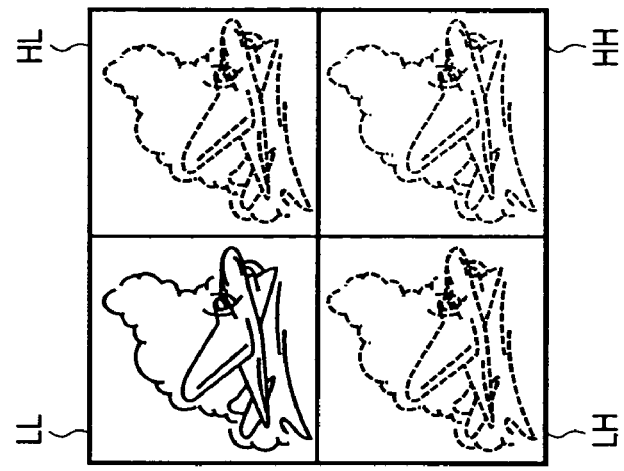
FIG. 2C is a view for explaining subbands of an image to be encoded, which is processed by 2D discrete wavelet transformation.
Figure 2B:
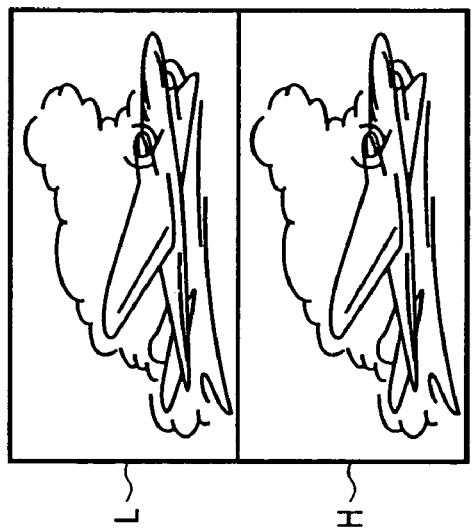
FIG. 2B is a view for explaining subbands of an image to be encoded, which is processed by 2D discrete wavelet transformation.
Figure 2A:
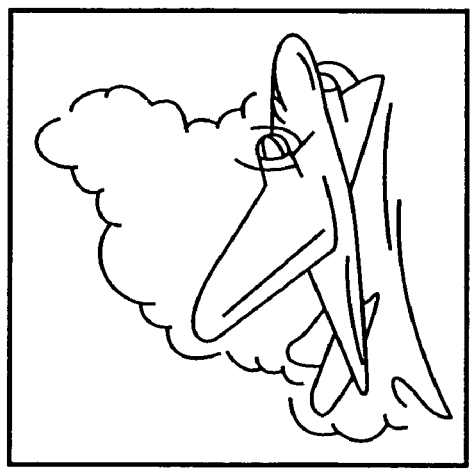
FIG. 2A is a view for explaining a subband of an image to be encoded, which is processed by two-dimensional (2D) discrete wavelet transformation.

Image data for one frame input from the moving image data input unit 201 is stored in the internal buffer (not shown) of the discrete wavelet transformer 202 as needed, and undergoes 2D discrete wavelet transformation. The 2D discrete wavelet transformation is implemented by applying linear discrete wavelet transformation in the horizontal and vertical directions. FIGS. 2A to 2C are views for explaining subbands of an image to be encoded, which is processed by the 2D discrete wavelet transformation.

More specifically, linear discrete wavelet transformation is applied to an image to be encoded shown in FIG. 2A in the vertical direction to decompose it into low- and high-frequency subbands L and H, as shown in FIG. 2B. Then, linear discrete wavelet transformation is applied to these subbands in the horizontal direction to decompose them into four subbands LL, HL, LH, and HH, as shown in FIG. 2C.

Figure 3:
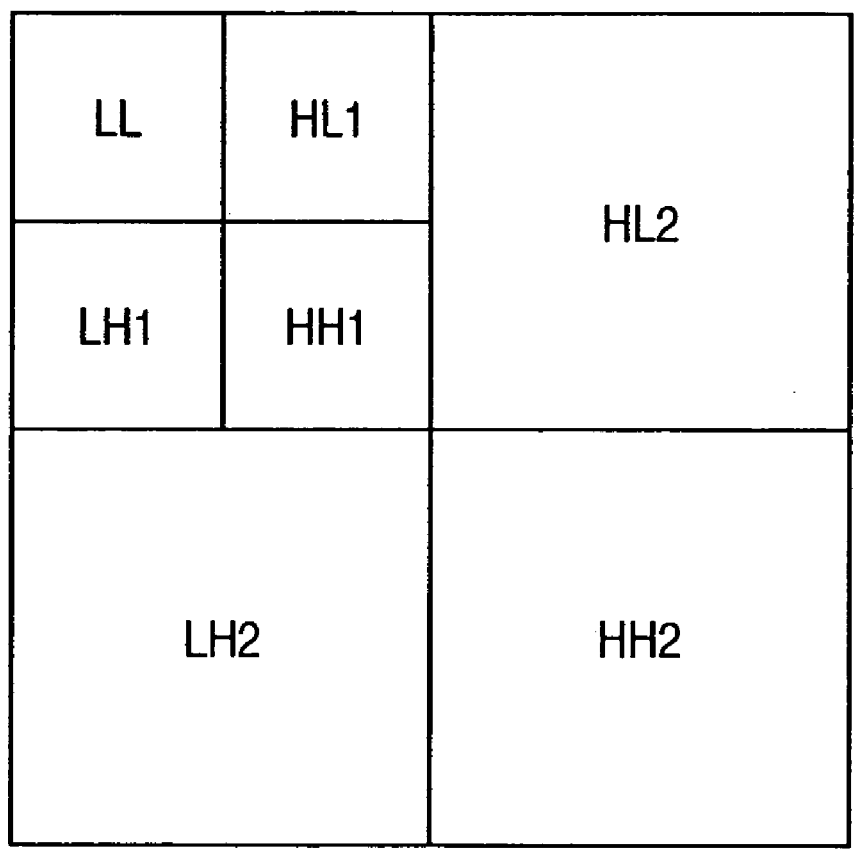
FIG. 3 shows seven subbands obtained by two 2D discrete wavelet transformation processes.

The discrete wavelet transformer 202 of the moving image encoding apparatus 202 further applies 2D discrete wavelet transformation to subband LL obtained by the aforementioned 2D discrete wavelet transformation. As a result, the image to be encoded can be broken up into seven subbands LL, LH1, HL1, HH1, LH2, HL2, and HH2. FIG. 3 shows the seven subbands obtained by the two 2D discrete wavelet transformation processes.

In the moving image encoding apparatus 200, C(Sb, x, y) represents a coefficient in each subband. Note that Sb represents the type of subbands, i.e., one of LL, LH1, HL1, HH1, LH2, HL2, and HH2. Also, (x, y) represents the coefficient position (coordinates) in the horizontal and vertical directions when the coefficient position of the upper left corner in each subband is specified by (0, 0).

The moving image encoding apparatus 200 comprises two linear discrete wavelet transformation methods for N linear signals s(n) (n is an integer ranging from 0 to N−1) in the discrete wavelet transformer 202. One method is transformation using an integer type 5×3 filter described by:

$$h(n)=s(2n+1)-\text{floor}\{(s(2n)+s(2n+2)/2)\} \qquad (1)$$

$$l(n)=s(2n)+\text{floor}\{(h(n-1)+h(n)+2)/4\} \qquad (2)$$

where h(n) is a coefficient of the high-frequency subband, l(n) is a coefficient of the low-frequency subband, and floor{R} is a maximum integer which is equal to or smaller than real number R.

The other method is transformation using a real number type 5×3 filter described by:

$$h(n)=s(2n+1)-(s(2n)+s(2n+2))/2 \qquad (3)$$

$$l(n)=s(2n)+(h(n-1)+h(n))/4 \qquad (4)$$

Note that values s(n) at two ends (n<0 and n>N−1) of linear signals s(n) required to calculate equations (1), (2), (3), and (4) are calculated from those of linear signals s(n) (n=0 to N−1) by a known method.

Which of the integer type 5×3 filter and the real number type 5×3 filter is to be applied can be designated for each frame by a filter selection signal input an external device via the signal line 207. For example, if the filter selection signal input via the signal line 207 is "0", the frame of interest is broken up using the integer type 5×3 filter; if the filter selection signal is "1", the frame of interest is broken up using the real number type 5×3 filter.

The coefficient quantizer 203 quantizes coefficients C(Sb, x, y) of respective subbands generated by the discrete wavelet transformer 202 using quantization steps delta(Sb) determined for respective subbands. Let Q(Sb, x, y) be the quantized coefficient value. Then, the quantization process to be done by the coefficient quantizer 203 is described by:

$$Q(Sb,x,y)=\text{sign}\{C(Sb,x,y)\}\times\text{floor}\{|C(Sb,x,y)|/\text{delta}(Sb)\} \quad (5)$$

where sign{l} is a function that represents the positive/negative sign of integer l, and returns 1 if l is positive or −1 if l is negative. Also, floor{R} is a maximum integer which is equal to or smaller than real number R. Note that the aforementioned quantization process is applied only when the discrete wavelet transformer 202 selects and uses the real number type 5×3 filter. When the integer type 5×3 filter is selected by the filter selection signal input via the signal line 207, coefficients C(Sb, x, y) are output as quantized coefficient values. That is, in this case, Q (Sb, x, y)=C(Sb, x, y).

The bitplane encoder 204 encodes the quantized coefficient values Q(Sb, x, y) quantized by the coefficient quantizer 203. Note that various encoding methods such as a method of segmenting the coefficients of respective subbands into blocks, and independently encoding blocks to allow easy random access, and the like have been proposed. However, in this embodiment, the coefficients are encoded for respective subbands for the sake of simplicity.

The quantized coefficient values Q(Sb, x, y) (to be simply referred to as "coefficient values" hereinafter) of respective subbands are encoded by expressing the absolute values of the coefficient values Q(Sb, x, y) in each subband by natural binary values, and applying binary arithmetic encoding to them from the upper to lower digits in favor of a bitplane direction. In the following description, Qn(x, y) represents a bit at the n-th digit from the LSB side when the coefficient value Q(Sb, x, y) of each subband is expressed by a natural binary value. Note that variable n that represents the digit of a binary value will be referred to as a bitplane number, and bitplane number n has the LSB (least significant bit) as the 0th digit position.

Figure 4:
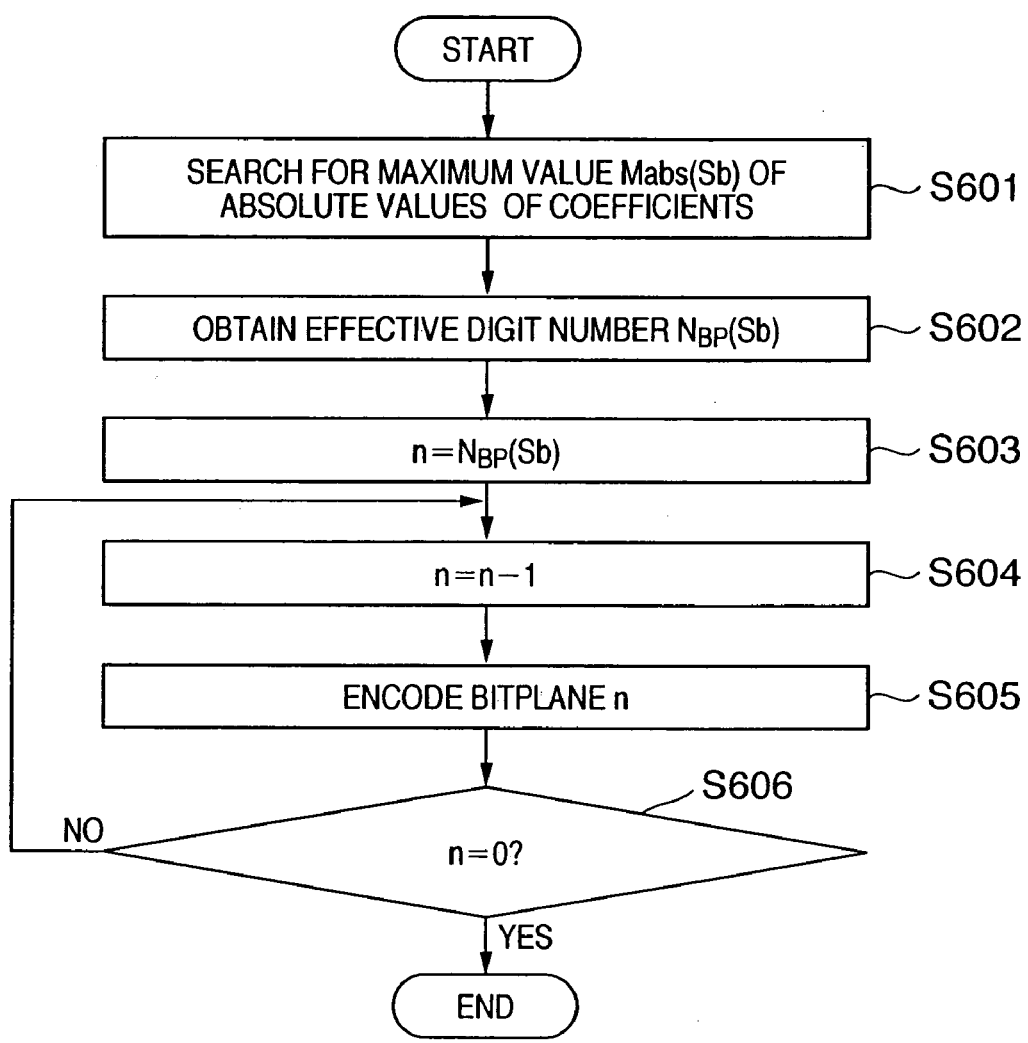
FIG. 4 is a flow chart for explaining the processing sequence for encoding subbands Sb by a bitplane encoder.

FIG. 4 is a flow chart for explaining the processing sequence for encoding subbands Sb by the bitplane encoder 204. As shown in FIG. 4, the absolute values of the coefficients in subband Sb to be encoded are checked to obtain a maximum value Mabs(Sb) (step S601). Next, the number of digits (to be referred to as a digit number hereinafter) $N_{BP}(Sb)$ required to express Mabs(Sb) by a binary value upon expressing the absolute values of the coefficients in subband Sb is calculated (step S602) by:

$$N_{BP}(Sb)=\text{ceil}\{\log 2(Mabs(Sb)+1)\} \quad (6)$$

where ceil{R} is a minimum integer equal to or larger than real number R.

The effective digit number $N_{BP}(Sb)$ is substituted in bitplane number n (step S603). Then, 1 is subtracted from bitplane number n to calculate n−1, and n−1 is substituted in n (step S604).

Furthermore, a bitplane at the n-th digit position is encoded using a binary arithmetic code (step S605). Upon encoding bits in a bitplane, bits are categorized into some contexts based on already encoded information, and are encoded using different occurrence probability prediction models for respective contexts. The moving image encoding apparatus 200 uses MQ-Coder as the arithmetic code. Since a sequence for encoding a binary symbol generated in a given context using this MQ-Coder, or the initialization and termination sequences for the arithmetic encoding process have been explained in detail in ISO/IEC15444-1 recommendation as the international standards of still images, a detailed description thereof will be omitted.

In the moving image encoding apparatus 200, an arithmetic encoder is initialized at the beginning of encoding of each bitplane, and undergoes a termination process at the end of the process. Immediately after "1" to be encoded first of each individual coefficient, the sign of that coefficient is expressed by 0 or 1, and is arithmetically encoded. If the sign is positive, the arithmetic code is 0; if it is negative, the code is 1. For example, if the coefficient is −5 and the effective digit number $N_{BP}(Sb)$ of subband Sb to which this coefficient belongs is 6, the absolute value of that coefficient is expressed by a binary value 000101, and is encoded from the upper to lower digits upon encoding respective bitplanes. Upon encoding the second bitplane (in this case, the fourth digit from the MSB side), first "1" is encoded, and immediately after this encoding, the sign is arithmetically encoded.

It is checked if bitplane number n=0 (step S606). As a result, if n=0, i.e., if the LSB plane has been encoded in step S605 (YES in step S606), the encoding process of subband Sb ends. Otherwise (NO in step S606), the flow returns to step S604.

With the above process, all coefficients of subband Sb are encoded to generate code sequences CS(Sb, n) corresponding to respective bitplanes n. The generated code sequences CS(Sb, n) are sent to the code sequence forming unit 205, and are temporarily stored in the internal buffer (not shown) of the code sequence forming unit 205.

If the coefficients of all subbands have been encoded by the bitplane encoder 204, and all code sequences are stored in the internal buffer of the code sequence forming unit 205, the code sequence forming unit 205 reads out the code sequences stored in its internal memory in a predetermined order. The unit 205 inserts required additional information to form a code sequence corresponding to one frame, and outputs that code sequence to the secondary storage device 206.

The final code sequence generated by the code sequence forming unit 205 includes a header and encoded data hierarchized in three levels 0, 1, and 2. The header stores additional information required upon decoding such as the numbers of pixels of an image in the horizontal and vertical directions, the number of times of application of 2D discrete wavelet transformation, information that designates the selected filter, quantization steps delta(Sb) of respective subbands, and the like.

The encoded data of level 0 includes code sequences CS(LL, $N_{BP}$(LL)−1) to CS(LL, 0) obtained by encoding the coefficients of LL subband. The encoded data of level 1 includes code sequences CS(LH1, $N_{BP}$(LH1)−1) to CS(LH1, 0), CS(HL1, $N_{BP}$(HL1)−1) to CS(HL1, 0), and CS(HH1, $N_{BP}$(HH1)−1) to CS(HH1, 0) obtained by encoding the coefficients of LH1, HL1, and HH1 subbands. The encoded data of level 2 includes code sequences CS(LH2, $N_{BP}$(LH2)−1) to CS(LH2, 0), CS(HL2, $N_{BP}$(HL2)−1) to CS(HL2, 0), and CS(HH2, $N_{BP}$(HH2)−1) to CS(HH2, 0) obtained by encoding the coefficients of LH2, HL2, and HH2 subbands.

Figure 5:
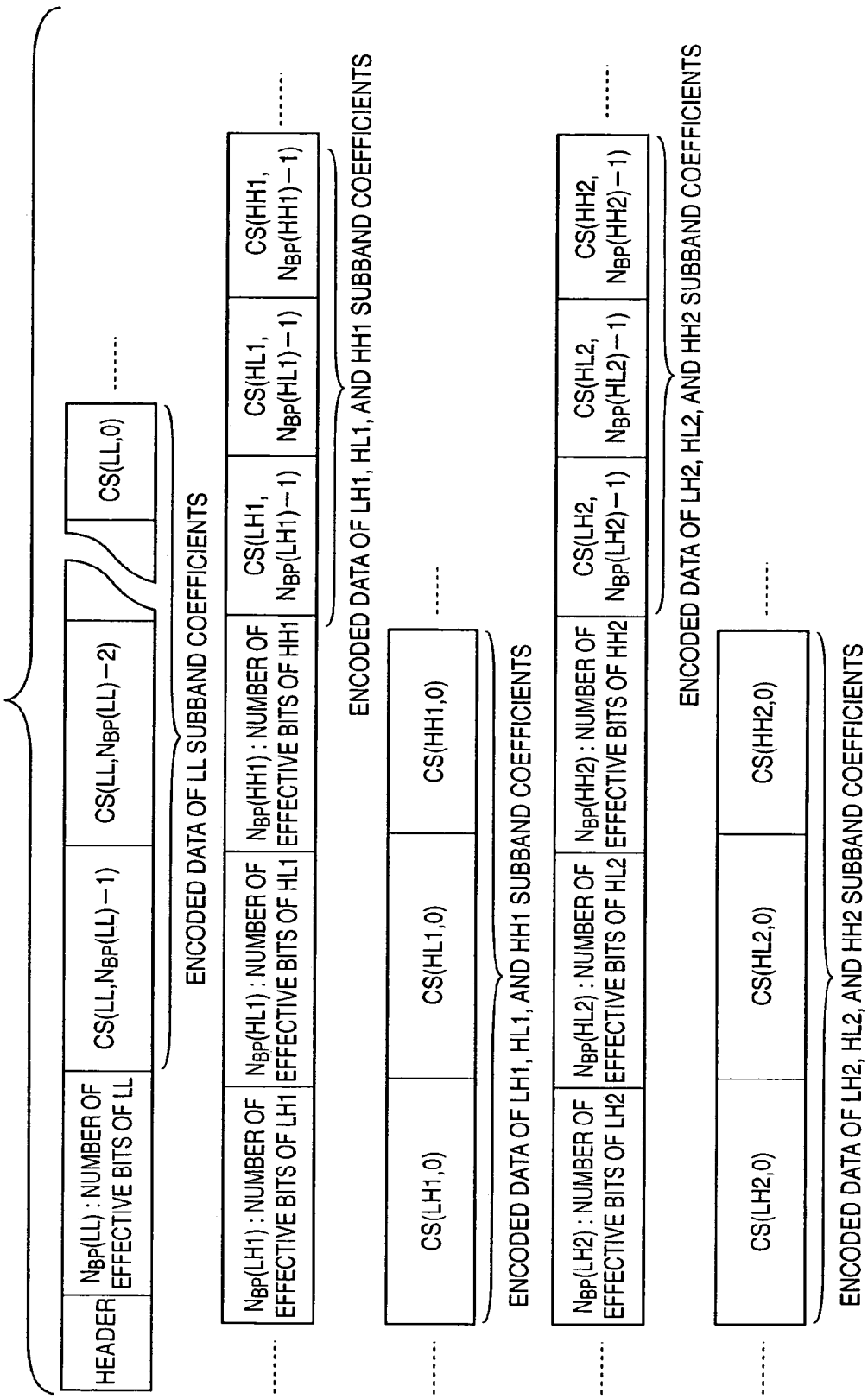
FIG. 5 shows the detailed structure of a code sequence corresponding to encoded moving image data for one frame, which is generated by a code sequence forming unit.

FIG. 5 shows the detailed structure of the code sequence corresponding to one frame data, which is generated by the code sequence forming unit 205.

The code sequence with the configuration shown in FIG. 5 allows the decoding side to obtain a reconstructed image of a resolution ¼ that of the original image by decoding the header and encoded data of level 0. Also, the decoding side can obtain a reconstructed image of a resolution ½ that of the original image by additionally decoding the encoded data of level 1. Furthermore, when the encoded data of level 2 is additionally decoded, a reconstructed image with the original resolution can be obtained. In this way, an image can be reclaimed by gradually increasing the resolution.

On the other hand, when only some of upper bitplanes of bitplane encoded data of respective levels are decoded, a coarse decoded image is obtained. When the number of bitplanes to be decoded is increased toward lower bitplanes, the transform coefficients of respective subbands can be reconstructed while gradually increasing the precision. Hence, the decoded image quality can be improved.

Figure 6:
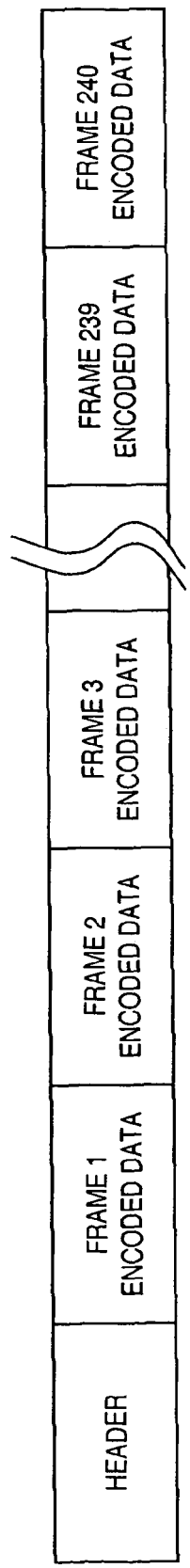
FIG. 6 shows an example of a code sequence of respective frames stored in a secondary storage device.

The secondary storage device 206 comprises, e.g., a hard disk, memory, or the like, and internally stores the code sequences generated by the code sequence forming unit 205. In the secondary storage device 206, the code sequences of respective frames output from the code sequence forming unit 205 are coupled to form encoded data of moving image data. FIG. 6 shows the structure of encoded moving image data stored in the secondary storage device 206. A header at the head of the sequence stores additional information for a moving image such as the number of frames, playback frame rate, and the like.

First Embodiment

Figure 7:
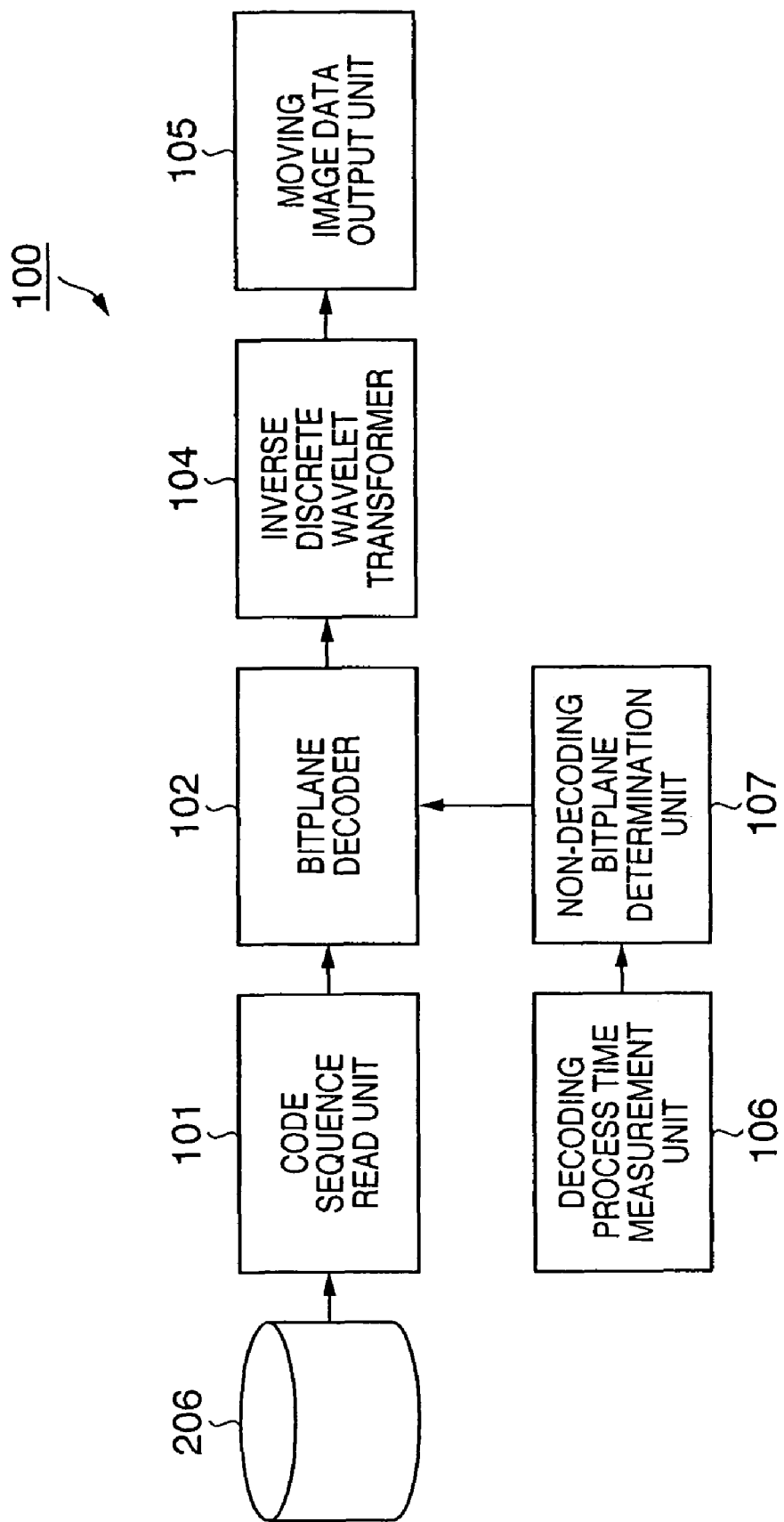
FIG. 7 is a block diagram showing the arrangement of a moving image decoding apparatus according to the first and third embodiments of the present invention.

FIG. 7 is a block diagram showing the arrangement of a moving image decoding apparatus 100 according to the first embodiment of the present invention. The same reference numerals in FIG. 7 denote blocks common to those in the aforementioned moving image encoding apparatus 200. As shown in FIG. 7, the moving image decoding apparatus 100 according to the first embodiment comprises a secondary storage device 206, code sequence read unit 101, bitplane decoder 102, inverse discrete wavelet transformer 104, moving image data output unit 105, decoding process time measurement unit 106, and non-decoding bitplane determination unit 107.

The operation sequence of the moving image decoding apparatus 100 of the first embodiment will be described below with reference to FIG. 7.

Encoded moving image data to be decoded by the moving image decoding apparatus 100 of the first embodiment is encoded data generated by the aforementioned moving image encoding apparatus 200. Assume that the integer type 5×3 filter is used for all the frames upon generation of encoded moving image data. That is, in the aforementioned moving image encoding apparatus 200 a signal for selecting the integer type 5×3 filter is input via the signal line 207 to encode moving image data.

Encoded moving image data is decoded for respective frames in encoded data. The code sequence read unit 101 reads out encoded data of a frame of interest from the encoded data stored in the secondary storage device 206, and stores it in its internal buffer (not shown). The encoded data for respective frames are read out in turn like frame 1, frame 2, . . .

The bitplane decoder 102 reads out the encoded data stored in the internal buffer of the code sequence read unit 101 in the order of subbands, and decodes it to obtain quantized transform coefficient data Q(Sb, x, y). The process in the bitplane decoder 102 forms a counterpart of that in the bitplane encoder 204 shown in FIG. 1.

That is, the bitplane encoder 204 encodes respective bits of the absolute values of coefficients in turn from the upper to lower bitplanes using a predetermined context by binary arithmetic coding. By contrast, the bitplane decoder 102 decodes binary arithmetic encoded data using the same context as that upon encoding from the upper to lower bitplanes to decode respective bits of coefficients. As for the positive/negative sign of each coefficient, an arithmetic code is decoded using the same context at the same timing as those upon encoding.

At this time, the non-decoding bitplane determination unit 107 designates the number ND(Sb) of lower bitplanes which are not to be decoded (to be referred to as non-decoding bitplane number ND(Sb) hereinafter) for each subband, and the bitplane decoder 102 skips decoding processes of the designated number of lower bitplanes. For example, if the non-decoding bitplane number ND(HH2) of subband HH2 designated by the non-decoding bitplane determination unit 107 is 2, the decoder 102 decodes CS(HH2, $N_{BP}$(HH2)−1) to CS(HH2, 2) of the encoded data of the coefficients of subband HH2 read out from the code sequence read unit 101 to reclaim the coefficients of that subband, and skips decoding of two bitplanes CS(HH2, 1) and CS(HH2, 0).

The inverse discrete wavelet transformer 104 executes inverse transformation of the wavelet transformation process in the discrete wavelet transformer 202 in FIG. 1 to reclaim data of the frame. In the moving image decoding apparatus 100 of the first embodiment, since encoded moving image data generated using the integer type 5×3 filter for all the frames is to be decoded, inverse transformation corresponding to equations (1) and (2) above is done.

Upon playing back and displaying a moving image, respective frame data are displayed at predetermined timings. On the other hand, since the output timings from the inverse discrete wavelet transformer 104 depend on a time required for the decoding process, they are not synchronized with the display timings. For this reason, decoded frame data must be stored in a buffer to adjust a difference from its display timing. For example, the moving image data output unit 105 may be implemented by a network interface, and a buffer storage process for adjusting the difference from the display timing may be executed outside the moving image decoding apparatus 100 of the first embodiment, or may be executed inside the moving image output unit 105.

Figure 16:
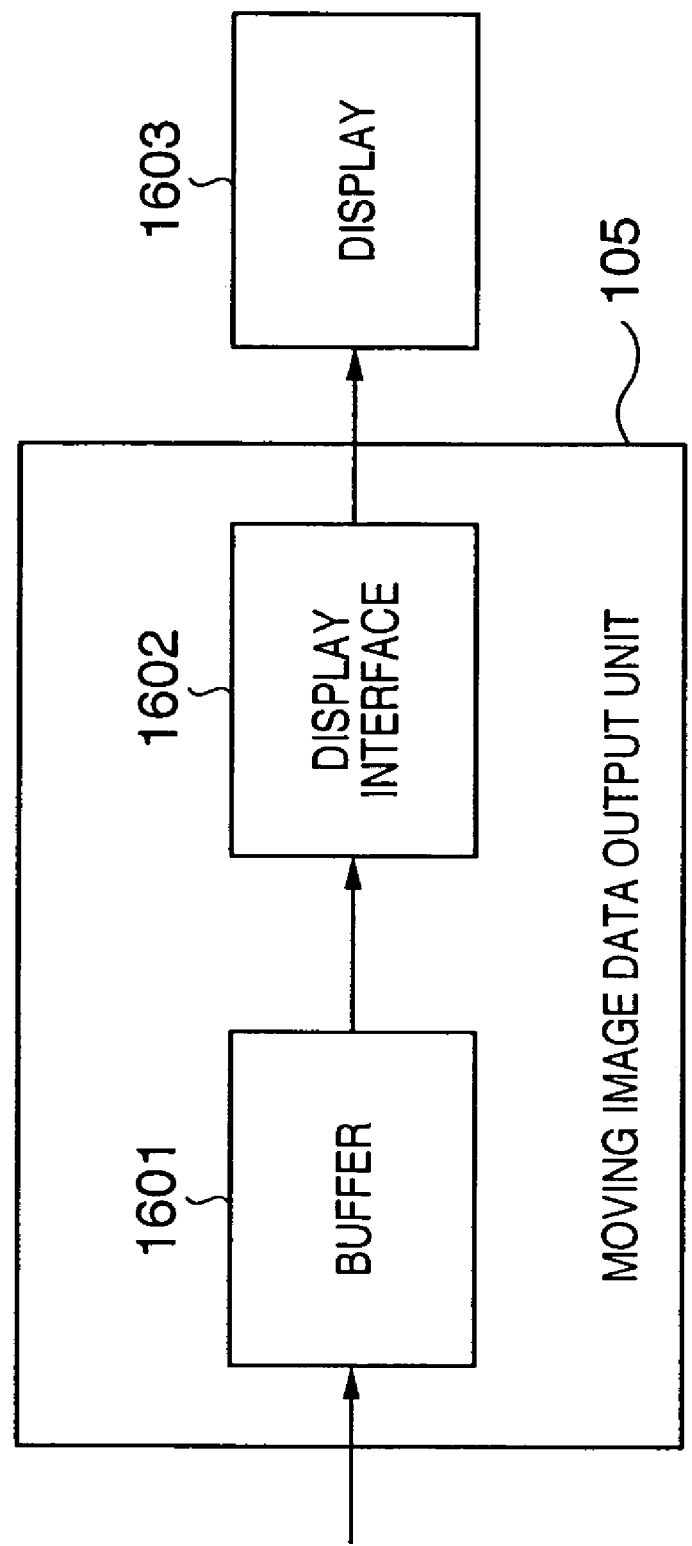
FIG. 16 is a block diagram showing an example of the detailed arrangement of a moving image data output unit.

As a practical example of the moving image data output unit 105, a case will be described below wherein a display is connected to the moving image data output unit 105 to display a moving image. FIG. 16 is a block diagram showing an embodiment of the moving image data output unit 105 and connection to a display. Referring to FIG. 16, reference numeral 1601 denotes a buffer which can store a plurality of frame data; 1602, a display interface; and 1603, a display. The buffer 1601 stores reconstructed image data output from the inverse discrete wavelet transformer 104 at variable time intervals in turn. Upon storing the reconstructed image data, the frame number and storage address of the reconstructed image data are held, so that the stored data can be read out in turn later. The display interface 1602 reads out the reconstructed image data from the buffer 1601 at given time intervals according to the frame rate of moving image data (at 1/30-sec intervals if a moving image has 30 frames/sec), and displays them on the display 1603. The readout frame data is erased from the buffer 1601. In this manner, the buffer 1601 serves to adjust the differences between the input timings of reconstructed image data from the inverse discrete wavelet transformer 104 and data read timings by the display interface.

The moving image decoding apparatus of this embodiment executes control so that the average of decoding process times per frame becomes a target decoding time T by a process to be described later. However, since the times required to decode respective data vary, the number of frame data stored in the buffer 1601 changes. For this reason, the moving image playback start timing is adjusted, e.g., to start the playback and display processes a predetermined period of time after the beginning of moving image decoding or to start the playback and display processes after a predetermined number of frames are stored in the buffer, so as to avoid a situation in that given frame data is not prepared in the buffer when its display timing is reached. When the buffer size is limited, and a predetermined number or more of frame data are stored in the buffer, control for pausing the frame data decoding process is also required.

The moving image data output unit 105 outputs reconstructed image data output from the inverse discrete wavelet transformer 104 to a device outside the apparatus. The moving image data output unit 105 can be implemented by an interface to, e.g., a network line or display device.

The decoding process time measurement unit 106 measures, for each frame, a time Dt required from the beginning of read of encoded frame data by the code sequence read unit 101 until the moving image data output unit 105 outputs reconstructed frame data, and outputs it to the non-decoding bitplane determination unit 107. However, when the moving image data output unit 105 comprises the internal buffer that stores frame data, and adjusts the output timings to a device outside the apparatus to constant time intervals, as exemplified in FIG. 16, the time Dt is that until frame data is stored in the buffer 1601.

The non-decoding bitplane determination unit 107 determines non-decoding bitplanes of each subband on the basis of the decoding process time per frame output from the decoding process time measurement unit 106. The non-decoding bitplane determination unit 107 holds variables Q (to be referred to as "Q factors" hereinafter) serving as index values upon determining the numbers of non-decoding bitplanes, a table indicating the non-decoding bitplane numbers of respective subbands in correspondence with Q factors, a target decoding process time T, and a time difference $\Delta T$. FIG. 8 shows an example of the table that represents the correspondence between the Q factors and the non-decoding bitplane numbers of respective subbands.

Figure 9:
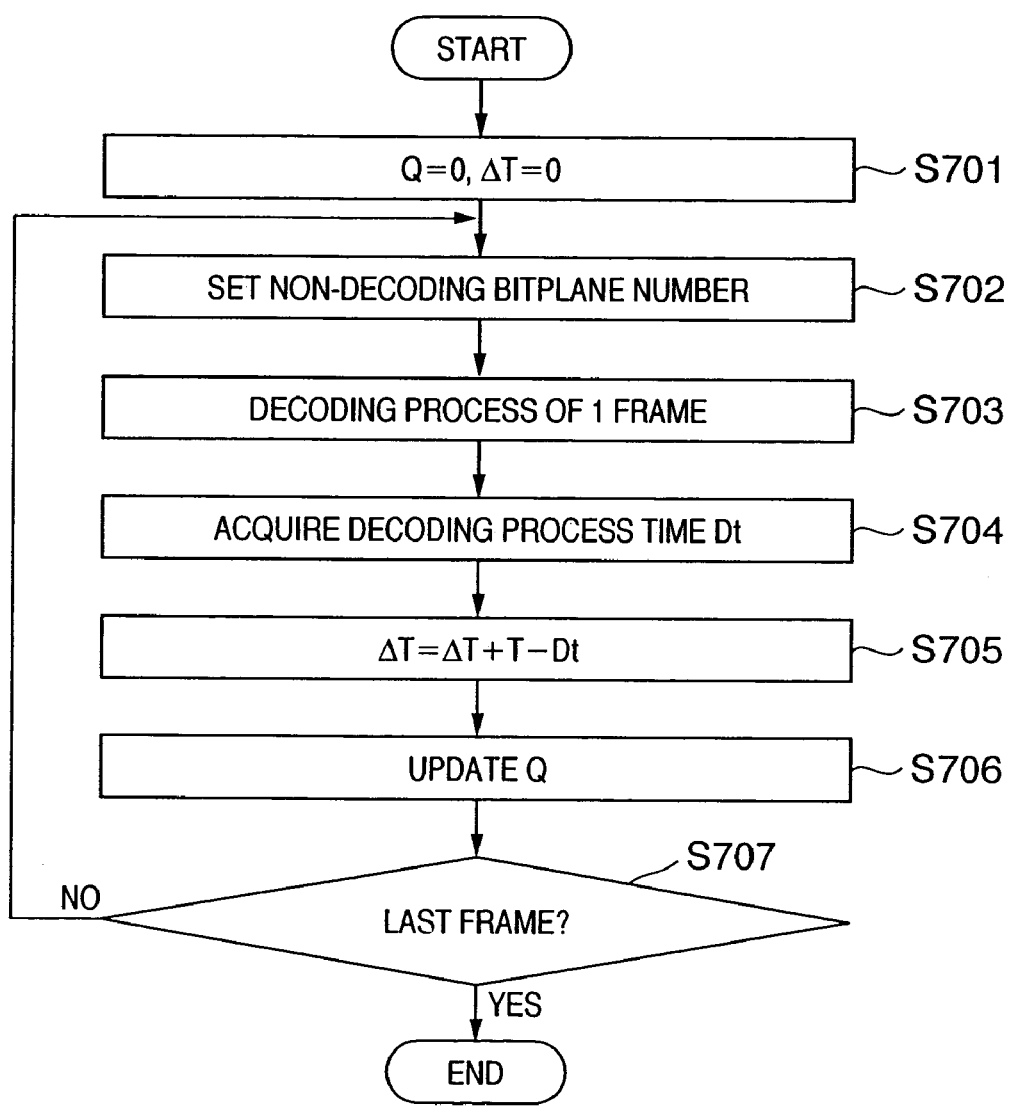
FIG. 9 is a flow chart showing the flow of the process of the moving image decoding apparatus according to the first and third embodiments of the present invention.

FIG. 9 is a flow chart showing the flow of the encoded moving image data decoding process by the moving image decoding apparatus 100. As shown in FIG. 9, the Q factor and time difference $\Delta T$ are reset to zero before the decoding start timing of encoded moving image data, i.e., before the beginning of decoding of encoded data of frame 1 (step S701).

The non-decoding bitplane determination unit 107 reads out the non-decoding bitplane number of each subband from the table on the basis of the Q factor, and sets it in the bitplane decoder 102 (step S702).

Next, one frame is decoded by the processes from the code sequence read unit 101 to the inverse discrete wavelet transformer 104, and frame data is output to the moving image data output unit 105 (step S703).

The decoding process time measurement unit 106 measures a time Dt required for the decoding process for one frame executed in step S703, and passes it to the non-decoding bitplane determination unit 107 (step S704).

The non-decoding bitplane determination unit 107 calculates a difference between the target decoding time T for one frame and the actually required decoding process time Dt, and adds it to the held time difference $\Delta T$ (step S705).

Next, the Q factor is updated according to the value of $\Delta T$ (step S706). If $\Delta T$ is larger than a predetermined threshold value Uq (Uq>0) which is set in advance, 1 is subtracted from Q to decrease the value Q. $\Delta T$ becomes larger than the predetermined threshold value when the sum total of the actually required decoding times is smaller than that of the target times. Hence, in order to improve the decoded image quality, the value Q is decreased to decrease the non-decoding bitplane number. By contrast, if $\Delta T$ is smaller than a predetermined threshold value Lq (Lq<0) which is set in advance, 1 is added to Q to increase the value Q. $\Delta T$ becomes smaller than the predetermined threshold value Lq when the sum total of the actually required decoding times is larger than that of the target times. Hence, in order to shorten a decoding time per frame, the value Q is increased to increase the non-decoding bitplane number. Note that the value Q ranges from 0 to 9. If Q<0 after the above update process, Q=0; if Q>9, Q=9. When $\Delta T$ falls within the range between the threshold values Lq and Uq (Lq$\leq\Delta T\leq$Uq), since the sum total of the actually required decoding times falls within an optimal range with respect to that of the target times, the value Q remains unchanged.

It is checked if the frame that has undergone the decoding process is the last frame. If the frame of interest is not the last frame (NO in step S707), the flow returns to step S702 to decode the next frame; otherwise (YES in step S707), the decoding process of the encoded moving image data ends (step S707).

As described above, the Q factor as an index value of the non-decoding bitplane number is determined based on the accumulated value of the differences each between the time required for the decoding process per frame and the target decoding time, and the non-decoding bitplane number is changed in accordance with the Q factor, thus controlling the decoding process time while suppressing visual problems of a playback image as much as possible.

Second Embodiment

The first embodiment has been described under the condition that subband decomposition is made using an integer type 5×3 filter for all frames of encoded moving image data to be decoded. In a moving image decoding apparatus of the second embodiment, a case will be explained wherein encoded moving image data which is generated by subband decomposition using a real number type 5×3 filter is to be decoded. That is, in the aforementioned moving image encoding apparatus 200 a signal for selecting the real number type 5×3 filter is input via the signal line 207 to encode moving image data. Upon encoding, all frames use an identical quantization step delta(Sb) of each subband.

Figure 10:
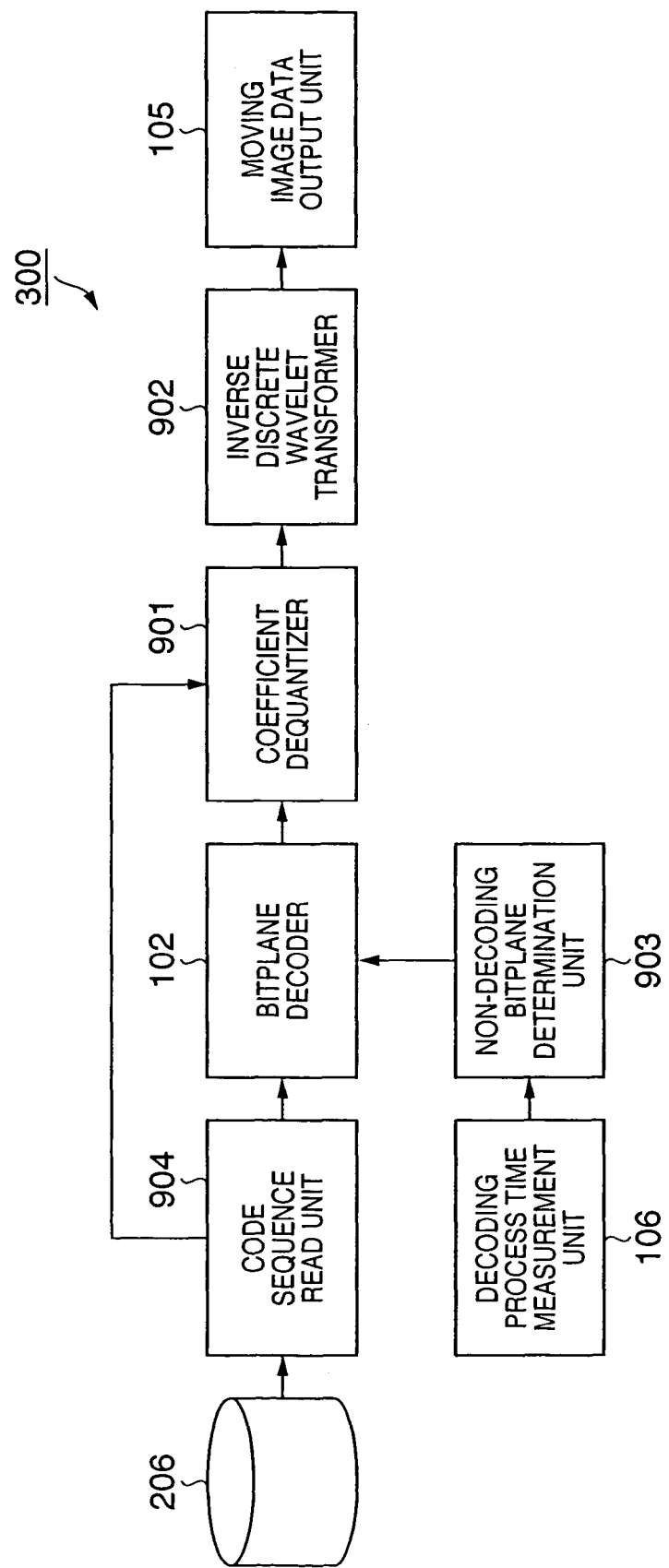
FIG. 10 is a block diagram showing the arrangement of a moving image decoding apparatus according to the second embodiment of the present invention.

FIG. 10 is a block diagram showing the arrangement of a moving image decoding apparatus 300 according to the second embodiment of the present invention. The same reference numerals in FIG. 10 denote blocks common to those in the aforementioned moving image encoding apparatus 200 and the moving image decoding apparatus 100 of the first embodiment. As shown in FIG. 10, the moving image decoding apparatus 300 according to the second embodiment comprises a secondary storage device 206, code sequence read unit 904, bitplane decoder 102, coefficient dequantizer 901, inverse discrete wavelet transformer 902, moving image data output unit 105, decoding process time measurement unit 106, and non-decoding bitplane determination unit 903.

The operation sequence of the moving image decoding apparatus 300 of the second embodiment will be described below using FIG. 10.

The code sequence read unit 904 reads out encoded data of a frame of interest from the encoded data stored in the secondary storage device 206, and stores it in its internal buffer (not shown) as in the code sequence read unit 101 of the first embodiment. At this time, the unit 904 reads out a quantization step delta(Sb) of each subband Sb from the header of the readout encoded data of the frame, and stores it in the internal buffer (not shown).

The bitplane decoder 102 decodes the encoded data stored in the internal buffer of the code sequence read unit 904 to obtain quantized transform coefficient data Q(Sb, x, y), as in the first embodiment. In the moving image decoding apparatus 300 of the second embodiment as well, the decoder 102 skips decoding processes of ND(Sb) lower bitplanes designated by the non-decoding bitplane determination unit 903.

The coefficient dequantizer 901 reclaims coefficients C(Sb, x, y) of each subband based on the quantization step delta(Sb) determined for each subband and the quantized coefficient data Q(Sb, x, y) decoded by the bitplane decoder 102.

The inverse discrete wavelet transformer 902 executes inverse transformation of the wavelet transformation process in the discrete wavelet transformer 202 in FIG. 1 to reclaim data of the frame. In the moving image decoding apparatus 300 of the second embodiment, since encoded moving image data generated using the real number type 5×3 filter for all the frames is to be decoded, inverse transformation corresponding to equations (3) and (4) above is done.

The moving image data output unit 105 outputs reconstructed image data output from the inverse discrete wavelet transformer 902 to a device outside the apparatus.

The decoding process time measurement unit 106 measures, for each frame, a time Dt required from the beginning of read of encoded frame data by the code sequence read unit 904 until the moving image data output unit 105 outputs reconstructed frame data, and outputs it to the non-decoding bitplane determination unit 903, as in the first embodiment.

The non-decoding bitplane determination unit 903 determines non-decoding bitplanes of each subband on the basis of the decoding process time per frame output from the decoding process time measurement unit 106. The non-decoding bitplane determination unit 903 holds a table indicating the non-decoding bitplane numbers ND(Sb) of respective subbands in correspondence with Q factors, a target decoding process time T, a time difference $\Delta T$, and a subband index SI. FIG. 11 shows an example of the table that holds the non-decoding bitplane numbers ND(Sb) for respective subbands Sb.

Figure 12:
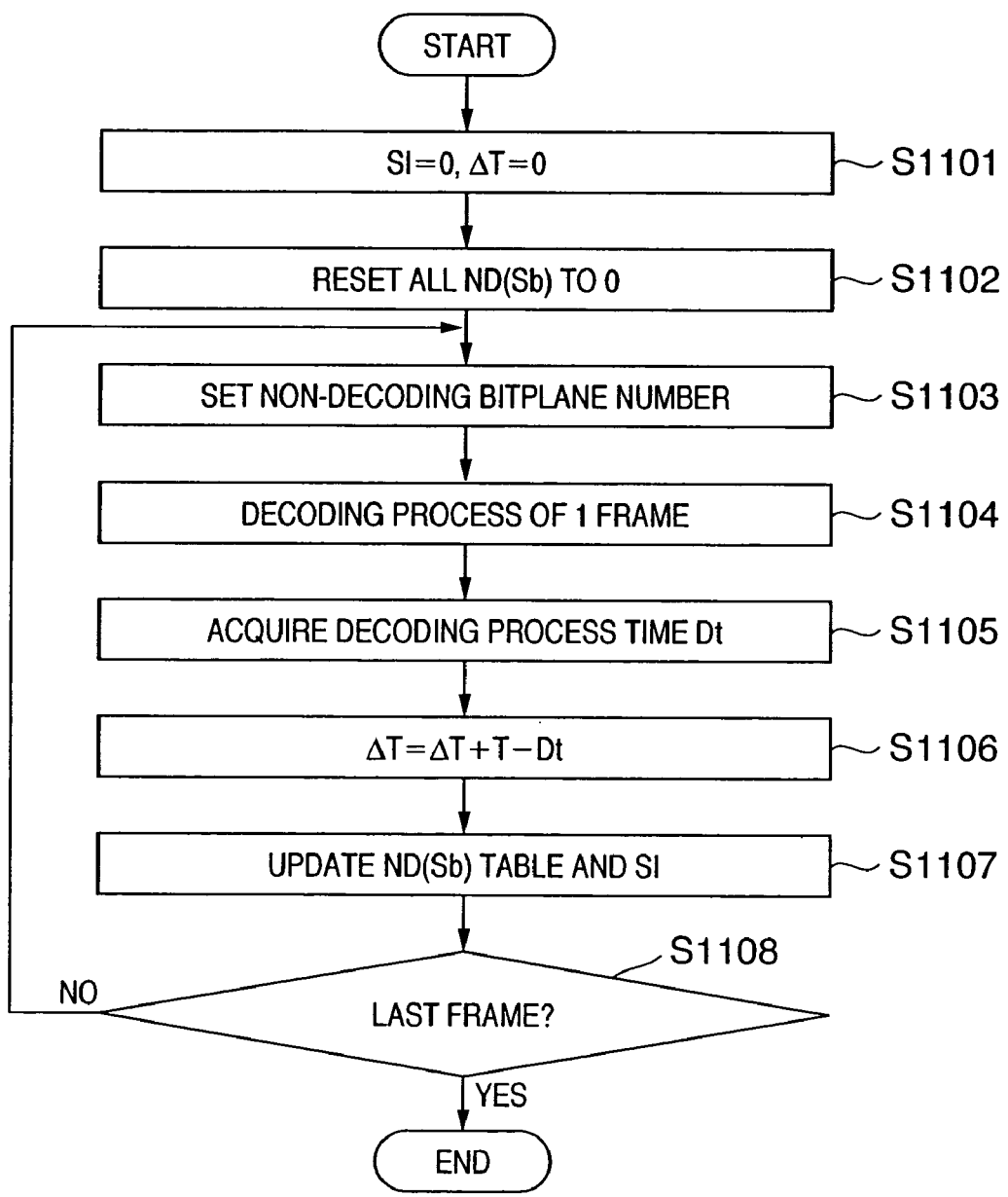
FIG. 12 is a flow chart showing the flow of the process of the moving image decoding apparatus according to the second embodiment of the present invention.

FIG. 12 is a flow chart showing the flow of the encoded moving image data decoding process by the image decoding apparatus 300 of this embodiment. As shown in FIG. 12, the subband index SI and time difference $\Delta T$ are reset to zero before the decoding start timing of encoded moving image data, i.e., before the beginning of decoding of encoded data of frame 1 (step S1101).

All non-decoding bitplane numbers ND(Sb) for respective subbands held in the non-decoding bitplane determination unit 903 are reset to zero (step S1102).

The non-decoding bitplane numbers ND(Sb) stored in the non-decoding bitplane determination unit 903 are read out and are set in the bitplane decoder 102 (step S1103).

Next, one frame is decoded by the processes from the code sequence read unit 904 to the inverse discrete wavelet transformer 902, and frame data is output to the moving image data output unit 105 (step S1104).

The decoding process time measurement unit 106 measures a time Dt required for the decoding process for one frame executed in step S1104, and passes it to the non-decoding bitplane determination unit 903 (step S1105).

The non-decoding bitplane determination unit 903 calculates a difference between the target decoding time T for one frame and the actually required decoding process time Dt, and adds it to the held time difference $\Delta T$ (step S1106).

The table that holds the non-decoding bitplane numbers ND(Sb) and subband index SI are updated according to the value of $\Delta T$ (step S1107).

Figure 13:
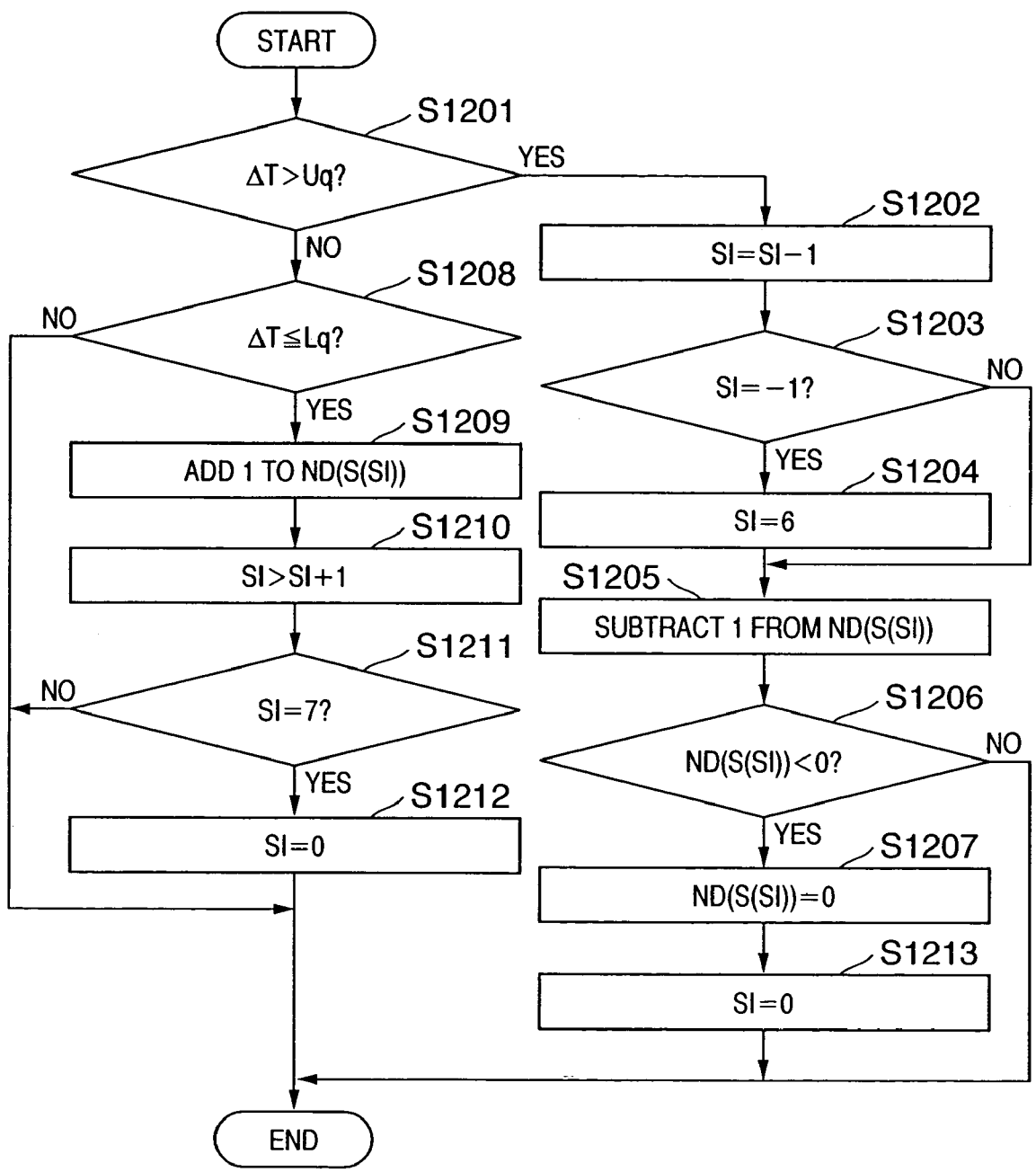
FIG. 13 is a flow chart showing the flow of the update process of an ND (Sb) table and SI in step S1107.

FIG. 13 is a flow chart showing the flow of the process executed in step S1107. It is checked if $\Delta T$ is larger than a predetermined threshold value Uq (Uq>0) which is set in advance (step S1201). If $\Delta T$>Uq (YES in step S1201), the subband index SI is decremented by 1 (step S1202). It is then checked if SI=-1 (step S1203). If SI=-1, SI is set to be 6 (step S1204). Then, 1 is subtracted from the non-decoding bitplane number NS(S(SI)) of subband S(SI) corresponding to the subband index SI (step S1205). $\Delta T$ becomes larger than the predetermined threshold value when the sum total of the actually required decoding times is smaller than that of the target times. Hence, the decoding image quality is improved by decreasing the non-decoding bitplane number. The correspondence between the subband indices SI and subbands is as shown in FIG. 14. For example, if SI=2, the corresponding subband is HL2, and 1 is subtracted from the value of ND(HL2). Then, ND(S(SI)) is compared with 0 (step S1206). If ND(S(SI)) assumes a value smaller than 0, ND(S(SI)) is set to be zero (step S1207), and SI is reset to zero (step S1213).

On the other hand, if $\Delta T \leq Uq$ as a result of comparison in step S1201 (i.e., NO in step S1201), $\Delta T$ is compared with a predetermined threshold value Lq (Lq<0) which is set in advance (step S1208). If $\Delta T$>Lq (NO in step S1208), the process ends. If $\Delta T \leq Lq$ (YES in step S1208), ND(S(SI)) is incremented by 1 (step S1209). $\Delta T$ becomes smaller than the predetermined threshold value when the sum total of the actually required decoding times is larger than that of the target times. Hence, the decoding time per frame is shortened by increasing the non-decoding bitplane number. Next, SI is also incremented by 1 (step S1210), and is compared with 7 (step S1211). If SI=7 (YES in step S1211), SI is set to be zero (step S1212).

With the above process, if $\Delta T$ is larger than the predetermined value or is smaller than another predetermined value, the non-decoding bitplane number ND(Sb) of one subband is changed by one level.

The description will revert to the process in FIG. 12. It is checked if the frame that has undergone the decoding process is the last frame (step S1108). If the frame of interest is not the last frame (NO in step S1108), the flow returns to step S1103 to decode the next frame; otherwise (YES in step S1108), the decoding process of the encoded moving image data ends.

As described above, the non-decoding bitplane number for each subband is changed in accordance with the accumulated value of the differences each between the time required for the decoding process per frame and the target decoding time, thus controlling the decoding process time while suppressing visual problems of a playback image as much as possible.

Third Embodiment

In the moving image decoding apparatuses of the first and second embodiments, a non-decoding part is determined for respective bitplanes. Alternatively, bits in a bitplane may be categorized into a plurality of passes (sub-bitplanes) based on encoded parts around the bit of interest, and a non-decoding part may be determined for respective passes. An embodiment that determines the non-decoding parts for respective passes will be explained below.

The process for generating encoded moving image data to be decoded by the moving image decoding apparatus of the third embodiment is basically the same as that of the moving image encoding apparatus 200 shown in FIG. 1, except for the method of encoding bitplanes in the bitplane encoder 204, i.e., that the encoder 204 encodes one bitplane while breaking it up into a plurality of passes, as described above. Although a description of a detailed pass segmentation method will be omitted for the sake of simplicity, encoding is done by the same method as the bitplane encoding method in JPEG2000 described in the ISO/IEC15444-1 recommendation. In JPEG2000, encoding is done while breaking up into three passes except for the most significant bitplane. Therefore, if the effective bit number of given subband Sb is $N_{BP}(Sb)$, encoding is done by $(N_{BP}(Sb)-1) \times 3+1$ passes. Let CSP(Sb, n) be codes generated by respective passes (n is a pass number; the first pass number=$(N_{BP}(Sb)-1) \times 3$) and the last pass number=0).

Figure 15:
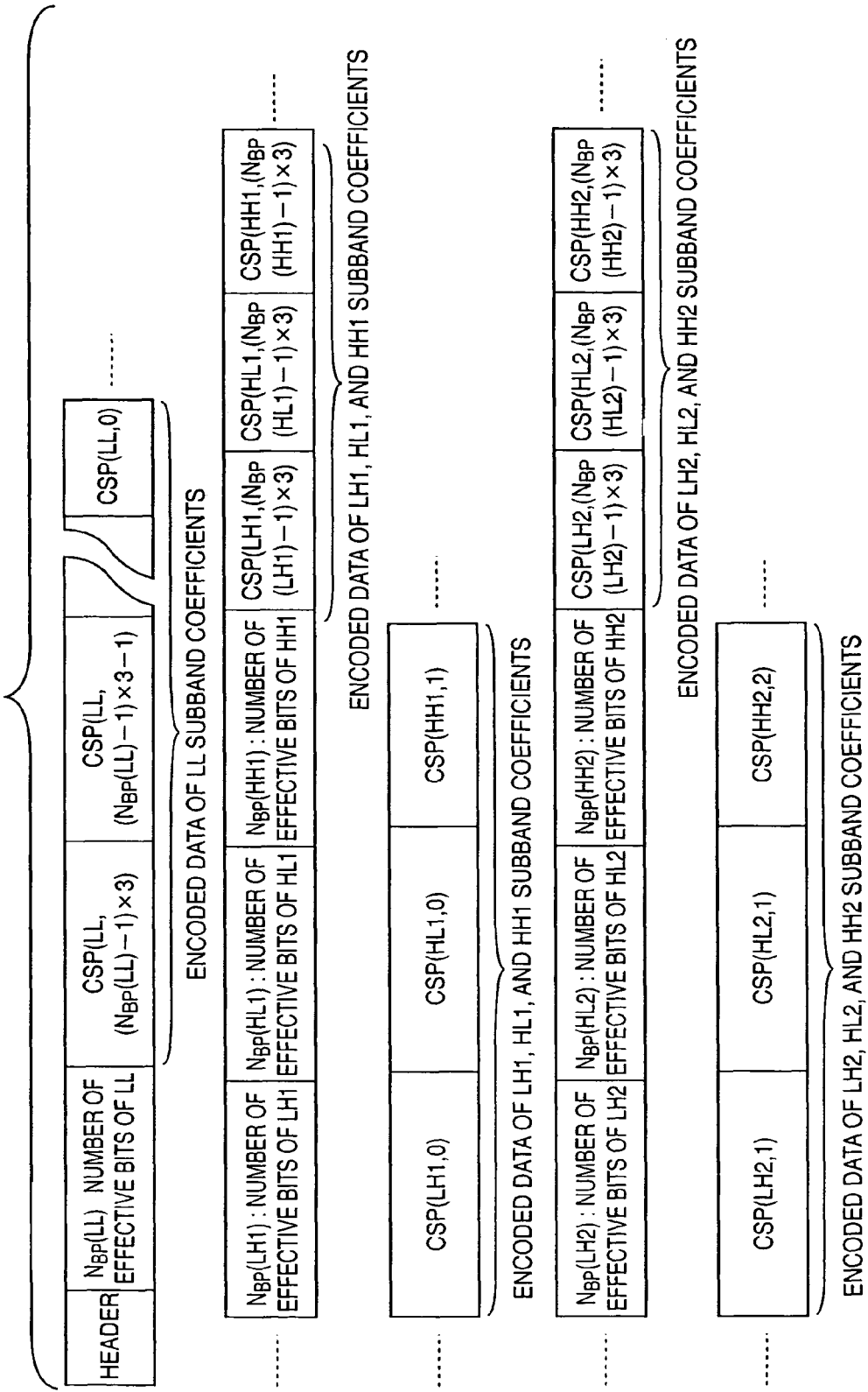
FIG. 15 shows the structure of encoded moving image data for one frame, which is to be decoded by the moving image decoding apparatus according to the third embodiment of the present invention.

The code sequence forming unit 205 forms a code sequence by arranging encoded data of passes in the same manner as in the above case wherein it forms a code sequence by arranging encoded data for respective bitplanes. FIG. 15 shows an example of the structure of encoded moving image data which is generated in this way, and is to be decoded by the moving image decoding apparatus of the third embodiment. A difference from the data to be decoded of the first and second embodiment shown in FIG. 5 is that pass encoded data CSP(Sb, n) replace bitplane encoded data CS(Sb, n) as elements which form encoded data (n is a bitplane or pass number). Furthermore, the encoded moving image data to be decoded in the first and second embodiments include all bitplane encoded data output from the bitplane encoder 204. However, in this embodiment, the code sequence forming unit 205 discards some encoded data. That is, the unit 205 discards encoded data of the last passes for subbands HH1, LH2, and HL2, and discards encoded data of the last two passes for HH2.

Note that the arrangement of the moving image decoding apparatus of the third embodiment is the same as that of the moving image decoding apparatus 100 of the first embodiment shown in FIG. 7, and only the operations of the bitplane decoder 102 and non-decoding bitplane determination unit 107 are different from the first embodiment.

The bitplane decoder 102 extracts bits of respective passes by decoding pass encoded data CSP(Sb, n) by the decoding process that forms a counterpart of the bitplane encoding process of the aforementioned moving image encoding apparatus 200, thus reclaiming subband coefficients. At this time, in the moving image decoding apparatus 100 of the first embodiment, the non-decoding bitplane determination unit 107 designates the lower bitplane numbers ND(Sb) which are not to be decoded. However, in the third embodiment, the non-decoding bitplane determination unit 107 designates the numbers NDP(Sb) of lower passes which are not to be decoded, and the bitplane decoder 102 skips the decoding process of lower NDP(Sb) passes. More specifically, the decoder 102 skips the decoding process from CSP(Sb, NDP(Sb)−1) to CSP(Sb, 0).

The non-decoding bitplane determination unit 107 designates the non-decoding pass numbers NDP(Sb) by the same process as that for designating the non-decoding bitplane numbers ND(Sb) to the bitplane decoder 102 in the first embodiment.

As described above, since the moving image decoding apparatus 100 of the third embodiment can set a non-decoding part using smaller encoding units than bitplanes, the decoded image quality and decoding time can be adjusted more finely.

Fourth Embodiment

In the first to third embodiments, the decoding range is adjusted based on the accumulated value ΔT of the differences each between the target decoding time T for each frame and actually required decoding process time Dt. As has been explained in the practical example of the moving image data output unit 105 in the first embodiment, when the moving image data output unit 105 comprises the buffer and display interface, and the display is connected to display a moving image, an equivalent process can be implemented by monitoring the number of frame data stored in the buffer without actually measuring the decoding process time. Such embodiment will be described below.

The process for generating encoded moving image data to be decoded by the moving image decoding apparatus of the fourth embodiment is the same as that of the moving image encoding apparatus 200 shown in FIG. 1.

Figure 17:
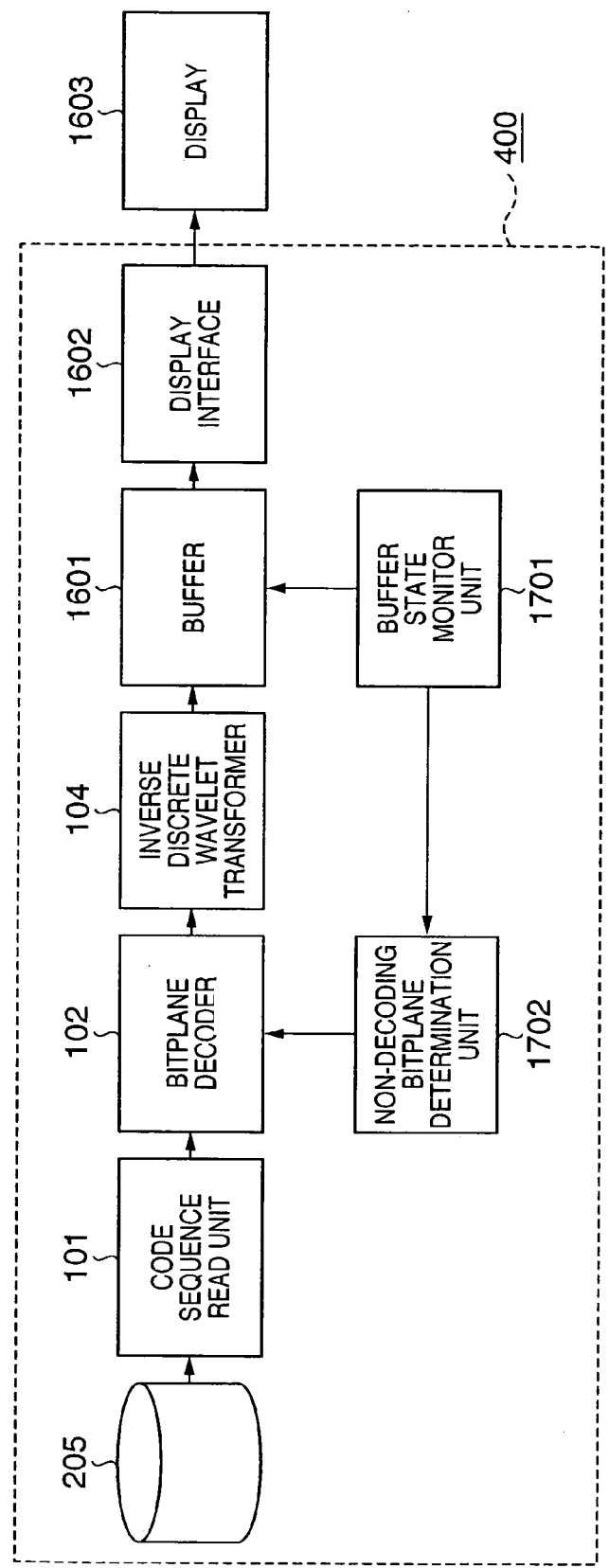
FIG. 17 is a block diagram showing the arrangement of a moving image decoding apparatus according to the fourth embodiment of the present invention.

FIG. 17 is a block diagram showing the arrangement of a moving image decoding apparatus 400 according to the fourth embodiment of the present invention. The same reference numerals in FIG. 17 denote blocks common to those in the aforementioned moving image encoding apparatus 200 and the moving image decoding apparatus 100 of the first embodiment. As shown in FIG. 17, the moving image decoding apparatus 400 according to the fourth embodiment comprises a secondary storage device 206, code sequence read unit 101, bitplane decoder 102, inverse discrete wavelet transformer 104, buffer 1601, display interface 1602, non-decoding bitplane determination unit 1702, and buffer state monitor unit 1701, and is connected to a display 1603. As shown in FIG. 17, in the moving image decoding apparatus 400 according to the fourth embodiment of the present invention, the moving image data output unit 105 of the moving image decoding apparatus 100 of the first embodiment comprises the buffer 1601 and display interface 1602, as shown in FIG. 16, the decoding process time measurement unit 106 is replaced by the buffer state monitor unit 1701, and the non-decoding bitplane determination unit 107 is replaced by the non-decoding bitplane determination unit 1702.

The operation sequence of the moving image decoding apparatus 400 of the fourth embodiment will be described below with reference to FIG. 17. The operations of the code sequence read unit 101, bitplane decoder 102, and inverse discrete wavelet transformer 104 are the same as those in the moving image decoding apparatus 100 of the first embodiment. Also, the basic operations of the buffer 1601 and display interface 1602 are as have been explained in the practical example of the moving image data output unit 105 in the first embodiment, which comprises a buffer and display interface. However, assume that the moving image decoding apparatus 400 of the fourth embodiment starts display of decoded frame data after an elapse of a time mT from the beginning of decoding so as to avoid a situation in that data to be displayed at a predetermined timing is not prepared in the buffer 1601 (T is the target decoding time per frame as in the above embodiment, and m is an arbitrary positive integer). That is, the display interface 1602 reads out decoded frame data in turn from the buffer 1601 at predetermined time intervals after an elapse of the time mT from the beginning of the decoding process, thus displaying them on the display. As a time required for preparing decoded data for one frame on the buffer 1601, if elements other than the decoding process time can be ignored, in case of a moving image that includes 30 frames/sec, the target decoding time T is 1/30 sec, and the time interval upon reading out decoded frame data from the buffer 1601 is also 1/30 sec.

Figure 18:
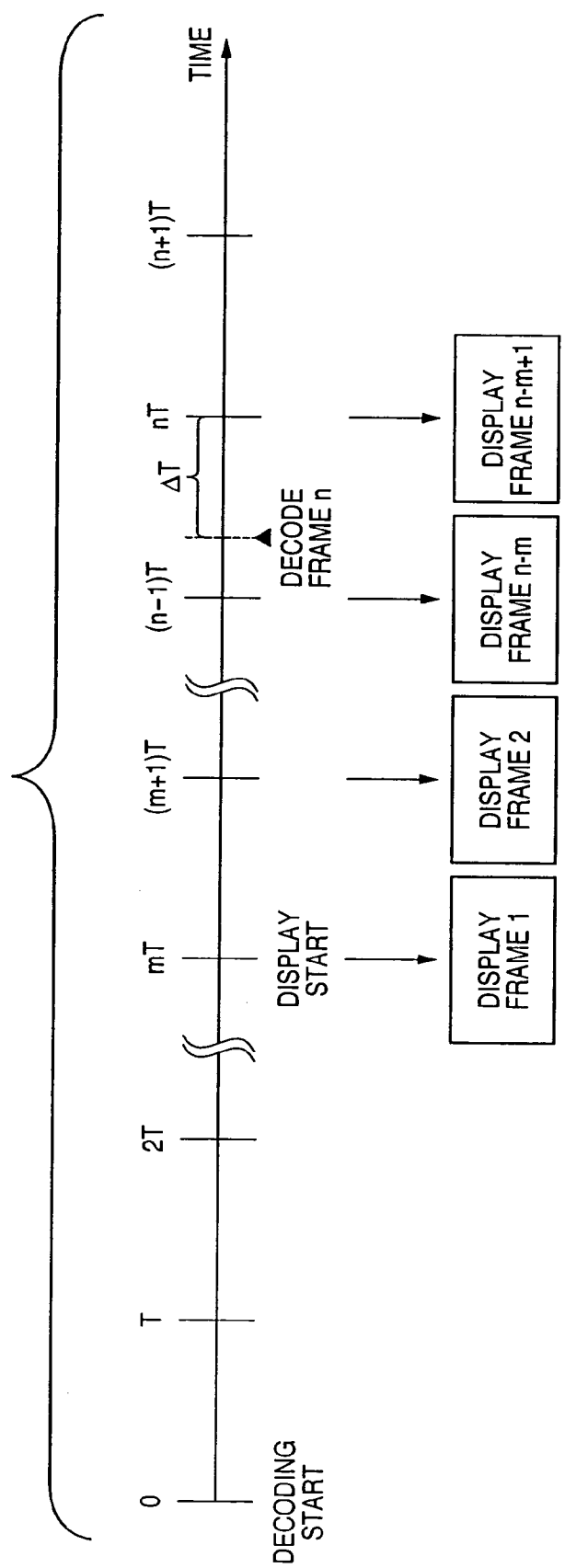
FIG. 18 is a time chart showing in time series the operations of the moving image decoding apparatus according to the fourth embodiment of the present invention.

FIG. 18 chronologically shows the operations of the moving image decoding apparatus from the beginning of decoding. As shown in FIG. 18, a first frame is displayed at a timing after an elapse of the time mT from the decoding start timing (time 0), and frames are displayed in sequence at time intervals T. The time difference $\Delta T$ which is used as an index upon controlling the decoding range in the first to third embodiments is calculated by subtracting the time required to decode given frame n of interest from the time nT, and the control is made based on this value. That is, if this value is larger than the upper limit value $U_q$, the decoding range is broadened to improve the decoded image quality; if this value is smaller than the lower limit value $L_q$, the decoding range is narrowed to reduce the decoded image quality and to shorten the decoding process time. The moving image decoding apparatus of the fourth embodiment implements equivalent control by focusing attention on the number of decoded frame data stored in the buffer 1601.

Referring to FIG. 18, let d be the time required from the start timing of decoding until the decoding end timing of frame n. Then, if $(n-1)T<d\leq nT$, i.e., if $0\leq \Delta T<T$, the number of decoded frames stored in the buffer 1601 at the decoding end timing of frame n is m. If $\Delta T>T$, m+1 or more decoded frame data are stored in the buffer 1601 at the decoding end timing of frame n. Conversely, if $nT<d\leq (n+1)T$, i.e., if $-T<\Delta T\leq 0$, the number of decoded frames stored in the buffer 1601 at the decoding end timing of frame n is m−1. If $\Delta T<-T$, m−2 or less frames are stored. If the number of decoded frames stored in the buffer 1601 at the decoding end timing of frame n is m+1 or more, control is made to broaden the decoding range so as to improve the decoded image quality; if the number of stored frames is m−2 or less, the control is made to reduce the decoded image quality and to shorten the decoding process time per frame. In this manner, the same operations as those upon controlling the decoding range based on $\Delta T$ ($U_q=T$ and $L_q=-T$) can be made. Assume that the decoded frame data storage process in the buffer 1601 by the inverse discrete wavelet transformer 104 and the read process of decoded frame data by the display interface 1602 do not take place at the same time.

The buffer state monitor unit 1701 acquires the number p of decoded frames which are stored in the buffer 1601 at every decoding end timing of a frame, and outputs it to the non-decoding bitplane determination unit 1702.

The non-decoding bitplane determination unit 1702 determines non-decoding bitplanes of respective subbands on the basis of the number p of stored frames output from the buffer state monitor unit 1701. The non-decoding bitplane determination unit 1702 holds variables Q (to be referred to as "Q factors" hereinafter) serving as index values upon determining the numbers of non-decoding bitplanes, a table indicating the non-decoding bitplane numbers of respective subbands in correspondence with Q factors, and a parameter m used to determine a delay time from the decoding start timing to the display start timing. FIG. 8 shows an example of the table that represents the correspondence between the Q factors and the non-decoding bitplane numbers of respective subbands.

Figure 19:
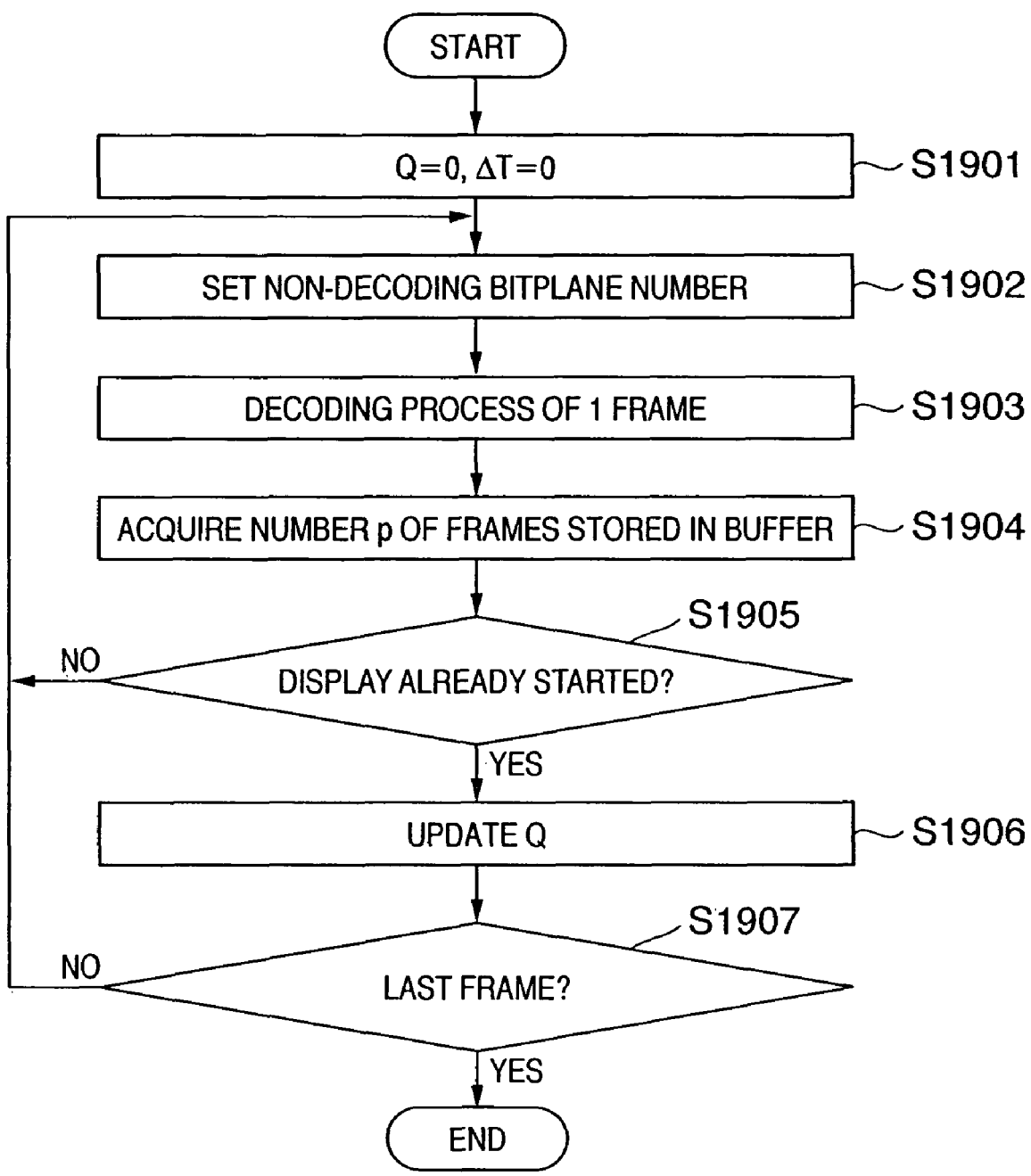
FIG. 19 is a flow chart showing the flow of the process of the moving image decoding apparatus according to the fourth embodiment of the present invention.

FIG. 19 is a flow chart showing the flow of the encoded moving image data decoding process by the moving image decoding apparatus 400. As shown in FIG. 19, the Q factor and time difference $\Delta T$ are reset to zero before the decoding start timing of encoded moving image data, i.e., before the beginning of decoding of encoded data of frame 1 (step S1901).

The non-decoding bitplane determination unit 1702 reads out the non-decoding bitplane number of each subband from the table on the basis of the Q factor, and sets it in the bitplane decoder 102 (step S1902).

Next, one frame is decoded by the processes from the code sequence read unit 101 to the inverse discrete wavelet transformer 104, and frame data is stored in the buffer 1601 (step S1903).

The buffer state monitor unit 1701 acquires the number p of frame data stored in the buffer 1601, and passes it to the non-decoding bitplane determination unit 1702 (step S1904).

It is checked whether or not the time mT has elapsed from the beginning of the decoding process, i.e., whether or not display of decoded frame data has started (step S1905). If display has not started yet (NO in step S1905), the flow returns to step S1902 to process the next frame. If display has already started (YES in step S1905), the Q factor is updated according to the value p (step S1906). If p is larger than m (i.e., p>m), 1 is subtracted from Q to decrease the value Q. p>m when the sum total of the actually required decoding times is smaller than that of the target times. Hence, in order to improve the decoded image quality, the value Q is decreased to decrease the non-decoding bitplane number. Conversely, if p is smaller than m−1 (i.e., p<m−1), 1 is added to Q to increase the value. p<m−1 when the sum total of the actually required decoding times is larger than that of the target times. Hence, in order to shorten the decoding time for one frame, the value is increased to increase the number of non-decoding bitplanes. Note that the value Q ranges from 0 to 9. If Q<0 after the above update process, Q=0; if Q>9, Q=9. If p=m, since the sum total of the actually required decoding times falls within an optimal range with respect to that of the target times, the value Q remains unchanged.

It is checked in step S1907 if the frame that has undergone the decoding process is the last frame. If the frame of interest is not the last frame (NO in step S1907), the flow returns to step S1902 to decode the next frame; otherwise (YES in step S1907), the decoding process of the encoded moving image data ends.

Even after the end of the decoding process, the display interface 1602 continues the read process of frame data stored in the buffer 1601 for the time mT.

As described above, the moving image decoding apparatus 400 of the fourth embodiment adjusts the decoding range using the number of decoded frames held in the buffer as a method equivalent to that for adjusting the decoding range on the basis of the accumulated value of the differences each between the time required for the decoding process per frame and the target decoding time. With this arrangement, even when it is difficult to measure the process time of each individual frame, the number of non-decoding bitplanes is changed in accordance with the number of decoded frames held in the buffer, thus controlling the decoding process time while suppressing visual problems of a playback image as much as possible.

Another Embodiment

The present invention is not limited to the above embodiments. For example, in the first to third embodiments, bitplane encoding is done for respective subbands. Alternatively, each subband may be segmented into blocks, and bitplane encoding may be made for respective blocks. Also, one bitplane may be encoded using a plurality of passes.

In the above example, MQ-Coder is used as the binary arithmetic encoding method. However, the present invention is not limited to the above embodiments. For example, arithmetic encoding methods other than MQ-Coder such as QM-Coder and the like may be adopted, and other binary encoding methods may be adopted as long as they are suited to encode a multi-context information source.

The filters for subband decomposition are not limited to those in the above embodiments. For example other filters such as a real number type 9×7 filter and the like may be used. Furthermore, the number of times of application of the filter is not limited to that in the above embodiments. In the above embodiments, linear discrete wavelet transformation is applied the same number of times in the horizontal and vertical directions, but need not always be applied the same number of times in the horizontal and vertical directions.

Moreover, the structure of the encoded moving image data is not limited to the above embodiments. For example, the order of the code sequence, the storage format of additional information, and the like may be modified. For example, the present invention is suitable for use of JPEG2000 specified by ISO/IEC15444-1 as the frame data encoding method, and encoded data described in the JPEG2000 standard or that of Motion JPEG2000 specified by the JPEG2000 standard Part 3 may be used.

In addition, the measurement method of the decoding process time is not limited to the above embodiment. For example, it may be estimated that wavelet transformation processes and the like require a nearly constant process time, and only a time required for bitplane decoding may be measured. Also, a process time for a plurality of frames may be measured to control a non-decoding part.

Fifth Embodiment

Figure 26:
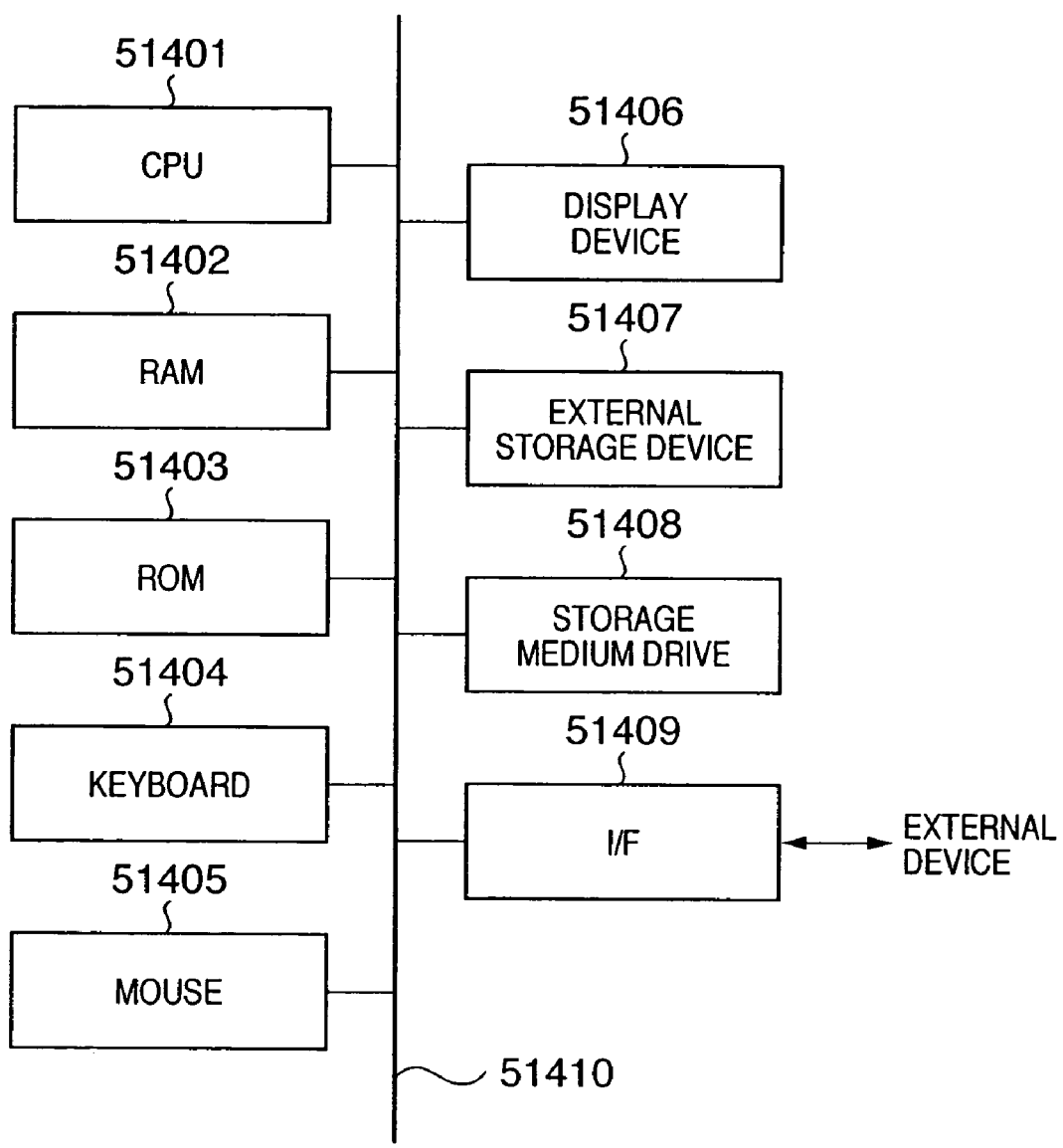
FIG. 26 is a block diagram showing the basic arrangement of the image decoding apparatus according to the fifth embodiment of the present invention.

FIG. 26 shows the basic arrangement of an image decoding apparatus according to this embodiment.

Reference numeral 51401 denotes a CPU which controls the overall apparatus using programs and data stored in a RAM 51402 and ROM 51403, and executes an image decoding process to be described later.

The RAM 51402 has an area for temporarily storing programs and data loaded from an external storage device 51407 and storage medium drive 51408 or those which are downloaded from an external device via an I/F 51409, and also has a work area used when the CPU 51401 executes various processes.

The ROM 51403 stores a boot program, and a setup program and data of this apparatus.

Reference numerals 51404 and 51405 denote a keyboard and mouse, which allow the user to input various instructions to the CPU 51401.

Reference numeral 51406 denotes a display device which comprises a CRT, liquid crystal display, or the like, and can display information such as images, text, and the like.

The external storage device 51407 comprises a large-capacity information storage device such as a hard disk drive or the like. The external storage device 51407 saves an OS, programs for an image decoding process to be described later, encoded data of moving images whose frames serve as images to be encoded, and the like. These programs and data are loaded onto a predetermined area on the RAM 51402 under the control of the CPU 51401.

The storage medium drive 51408 reads out programs and data recorded on a storage medium such as a CD-ROM, DVD-ROM, or the like, and outputs them to the RAM 51402 and external storage device 51407. Note that the storage medium may record programs for an image decoding process to be described later, encoded data of moving images whose frames serve as images to be encoded, and the like. In this case, the storage medium drive 51408 loads these programs and data onto a predetermined area on the RAM 51402 under the control of the CPU 51401.

The I/F 51409 connects this apparatus to an external device, and allows data communications between this apparatus and the external device. For example, the aforementioned moving image encoding apparatus may be connected to the I/F 51409 to input encoded moving image data generated by that moving image encoding apparatus to the RAM 51402 and external storage device 51407 of this apparatus.

Reference numeral 51410 denotes a bus which interconnects the aforementioned units.

Note that the arrangement shown in FIG. 26 may be applied to the decoding apparatuses of the above embodiments.

Figure 21:
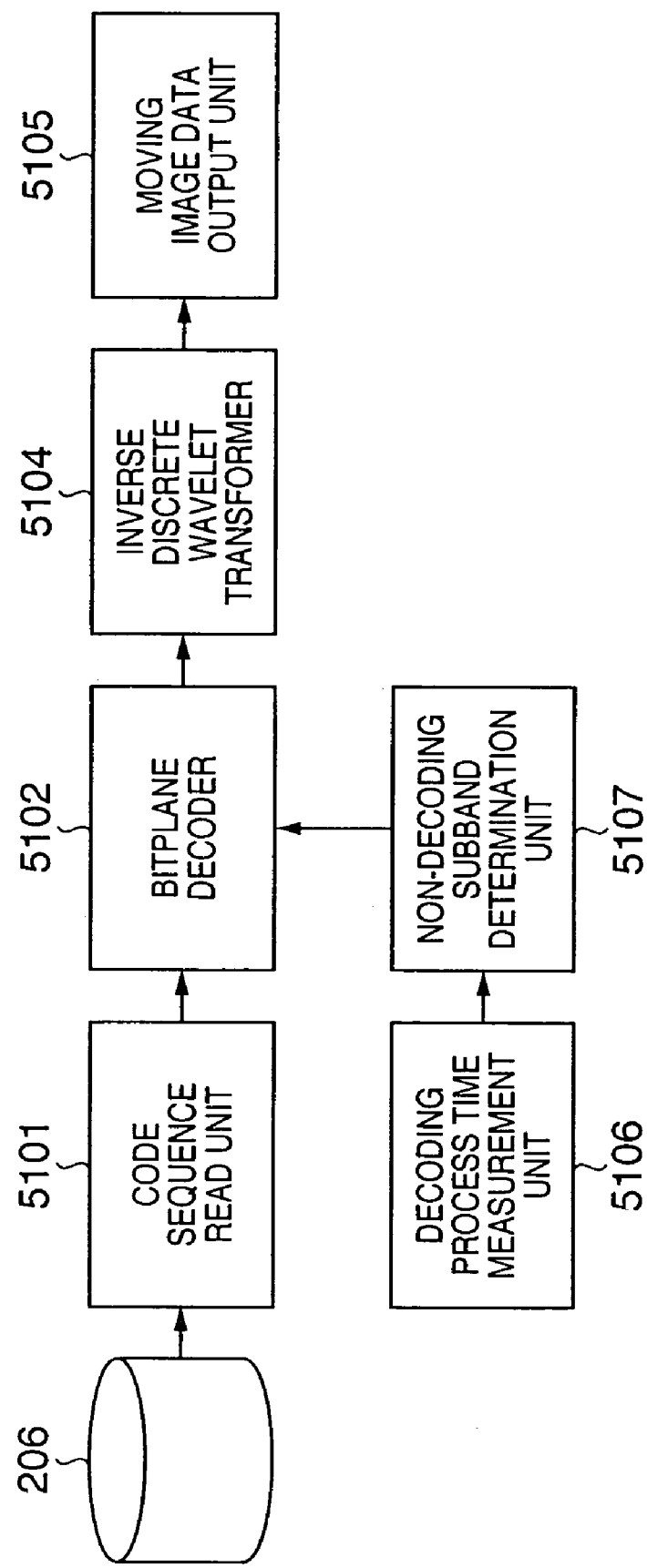
FIG. 21 is a block diagram showing the functional arrangement of an image decoding apparatus according to the fifth embodiment of the present invention.

FIG. 21 is a block diagram showing the functional arrangement of the image decoding apparatus according to this embodiment. The same reference numerals in FIG. 21 denote the same parts as those in FIG. 1. As shown in FIG. 21, the image decoding apparatus according to this embodiment comprises a code sequence read unit 5101, bitplane decoder 5102, inverse discrete wavelet transformer 5104, moving image data output unit 5105, decoding process time measurement unit 5106, and non-decoding subband determination unit 5107. Note that the arrangement shown in FIG. 21 may be implemented by hardware. However, in this embodiment, the respective units shown in FIG. 21 are implemented by a program which makes a computer implement the functions of the respective units, and this program is loaded from the external storage device 51407 or storage medium driver 51408, or from the external device via the I/F 51409 onto the RAM 51402.

In FIG. 21, reference numeral 206 denotes a secondary storage device described above, from which encoded moving image data is input to this apparatus. Assume that this secondary storage device 206 corresponds to the external storage device 51407 or storage medium driver 51408, or the external device connected to this apparatus via the I/F 51409, and encoded moving image data is loaded onto the RAM 51402 from one of these devices. Note that this encoded moving image data is generated by the moving image encoding apparatus, as described above.

The process to be executed by the image decoding apparatus according to this embodiment will be described below with reference to FIG. 21.

Encoded moving image data to be decoded by the image decoding apparatus according to this embodiment is generated by the aforementioned moving image encoding apparatus. Upon generating this encoded moving image data, the integer type 5×3 filter is used for all the frames. That is, in the aforementioned moving image encoding apparatus a signal for selecting the integer type 5×3 filter is input via the signal line 207 to encode moving image data.

The image decoding apparatus according to this embodiment initially extracts encoded image data of an arbitrary frame from the encoded moving image data to be decoded as a sample, and measures times required for the decoding processes of respective subbands, thus estimating the decoding process time.

In general, encoded moving image data is decoded for each frame in that data. The code sequence read unit 5101 shown in FIG. 21 reads out encoded data of a frame of interest from the encoded moving image data stored in the secondary storage device 206, and stores it in the RAM 51402. The encoded data for respective frames are basically read out in turn like frame 1, frame 2, ..., but this embodiment reads but encoded data of an arbitrary frame as a sample and stores it in the RAM 51402 at the beginning of the decoding process, so as to estimate the decoding process time by measuring the times required for the decoding processes of respective subbands. In the following description, assume that the 60th frame is used as a frame to be decoded to estimate the decoding process time (to be referred to as a sample frame hereinafter) for the sake of simplicity, but the present invention is not limited to such specific frame.

The bitplane decoder 5102 reads out the encoded data stored in the RAM 51402 in the order of subbands, and decodes it to obtain quantized transform coefficient data Q(Sb, x, y). The process in the bitplane decoder 5102 is opposite to that in the bitplane encoder 204 shown in FIG. 1. That is, the bitplane encoder 204 encodes respective bits of the absolute values of coefficients in turn from the upper to lower bitplanes using a predetermined context by binary arithmetic coding. By contrast, the bitplane decoder 5102 decodes binary arithmetic encoded data using the same context as that upon encoding from the upper to lower bitplanes to decode respective bits of coefficients. As for the positive/negative sign of each coefficient, an arithmetic code is decoded using the same context at the same timing as those upon encoding.

At this time, data F(Sb) indicating whether or not to decode each subband is input from the non-decoding subband determination unit 5107. The bitplane decoder 5102 decodes respective bitplanes of subband Sb which corresponds to F(Sb)=1, and skips decoding of subband Sb which corresponds to F(Sb)=0. This data F(Sb) is generated by the non-decoding subband determination unit 5107, and this generation process will be described later.

Note that F(Sb)=1 is set for all subbands Sb of the sample frame which is to be decoded first by the image decoding apparatus of this embodiment, thus decoding all subbands. Assume that the data F(Sb) for the sample frame is loaded in advance onto the RAM 51402.

The inverse discrete wavelet transformer 5104 executes inverse transformation of the wavelet transformation process in the discrete wavelet transformer 202 in FIG. 1 to reclaim data of the frame. In this embodiment, since encoded moving image data generated using the integer type 5×3 filter for all the frames is to be decoded, as described above, inverse transformation corresponding to equations (1) and (2) above is done.

The moving image data output unit 5105 outputs reconstructed image data output from the inverse discrete wavelet transformer 5104 to an external device via the I/F 51409 or outputs it to the display device 51406. However, since data of the sample frame, which is decoded first by the image decoding apparatus of this embodiment, is decoded for the purpose of estimating the decoding process time, the decoded frame data is discarded and is not output.

Upon playing back and displaying a moving image, respective frame data are displayed at predetermined timings. On the other hand, since the output timings from the inverse discrete wavelet transformer 5104 depend on the time required for the decoding process, they are not synchronized with the display timings. For this reason, decoded frame data must be stored in a buffer to adjust a difference from its display timing. For example, the moving image data output unit 5105 may output the reconstructed image data to the external device via the I/F 51409 to execute a buffer storage process for adjusting the difference from the display timing outside the moving image decoding apparatus of this embodiment, or that process may be executed inside the moving image output unit 5105.

As a practical example of the moving image data output unit 5105, a display may be connected to the moving image data output unit 5105 to display a moving image in some cases, and the arrangement at that time is as shown in FIG. 16. The display 1603 corresponds to the display device 51406 shown in FIG. 26, and a connection line between the display interface 1602 and the display device 51406 corresponds to the bus 51410.

The decoding process time measurement unit 5106 measures times (decoding times Dt(SI)) required to decode the coefficients of respective subbands of the sample frame by the bitplane decoder 5102 (Si is an index value that specifies each subband). That is, if a decoding unit of the decoding process by the bitplane decoder 5102 is "subband", the decoding process time measurement unit 5106 measures a decoding time Dt(SI) for each decoding unit. The decoding process time measurement unit 5106 forms a table shown in FIG. 22 based on this measurement result, and stores this table data in the RAM 51402.

FIG. 22 shows an example of the configuration of the table which represents the relationship between subband indices SI and coefficient decoding time (required decoding times) of subbands Sb. Fields Dt(0) to Dt(6) store actually measured times. By looking up this table, for example, the coefficient decoding time of subband HH1 (SI=3) can be specified as Dt(3).

Also, the decoding process time measurement unit 5106 measures a time Dt required from the beginning of read of encoded frame data by the code sequence read unit 5101 from the secondary storage device 206 until the moving image data output unit 5105 outputs reconstructed frame data as a "time required to decode encoded image data for one frame", and outputs it to the non-decoding subband determination unit 5107. In this embodiment, the decoding process time measurement unit 5106 measures the time Dt required to decode encoded image data of the sample frame first.

The decoding process time measurement unit 5106 measures the time Dt for each of frames other than the first frame in the moving image, and outputs it to the non-decoding subband determination unit 5107.

The non-decoding subband determination unit 5107 executes a process for determining a subband which is not to be decoded of those which form the encoded image data for one frame, so that the decoding process time Dt of the sample frame output from the decoding process time measurement unit 5106 becomes equal to or smaller than a value pre-stored in the RAM 51402 as an upper limit value of the time required to reclaim and output image data for one frame. More specifically, the unit 5107 determines whether or not each subband is to be decoded.

Assume that the RAM 51402 holds, before this process, a variable M indicating the number of non-decoding subbands, data of a decoding flag F(Sb) (in an initial state) indicating if each subband is to be decoded, a variable T indicating the upper limit (target decoding process time) of the time required to reclaim and output image data for one frame, and a variable ΔT indicating the time difference.

A subband (or subbands) which is not to be decoded is determined by a process to be described later, and data of a decoding flag (or flags) F(Sb) which reflects the determination result is generated.

FIG. 23 shows an example of the configuration of a table showing decoding flags F(Sb) for respective subbands Sb. FIG. 23 shows the table when the non-decoding subband number M=3, and M subbands in turn from the uppermost one in the subband list of FIG. 23 are set to be non-decoding subbands. A process to be described later generates the table shown in FIG. 23 and stores the generated table data in the RAM 51402.

Figure 24:
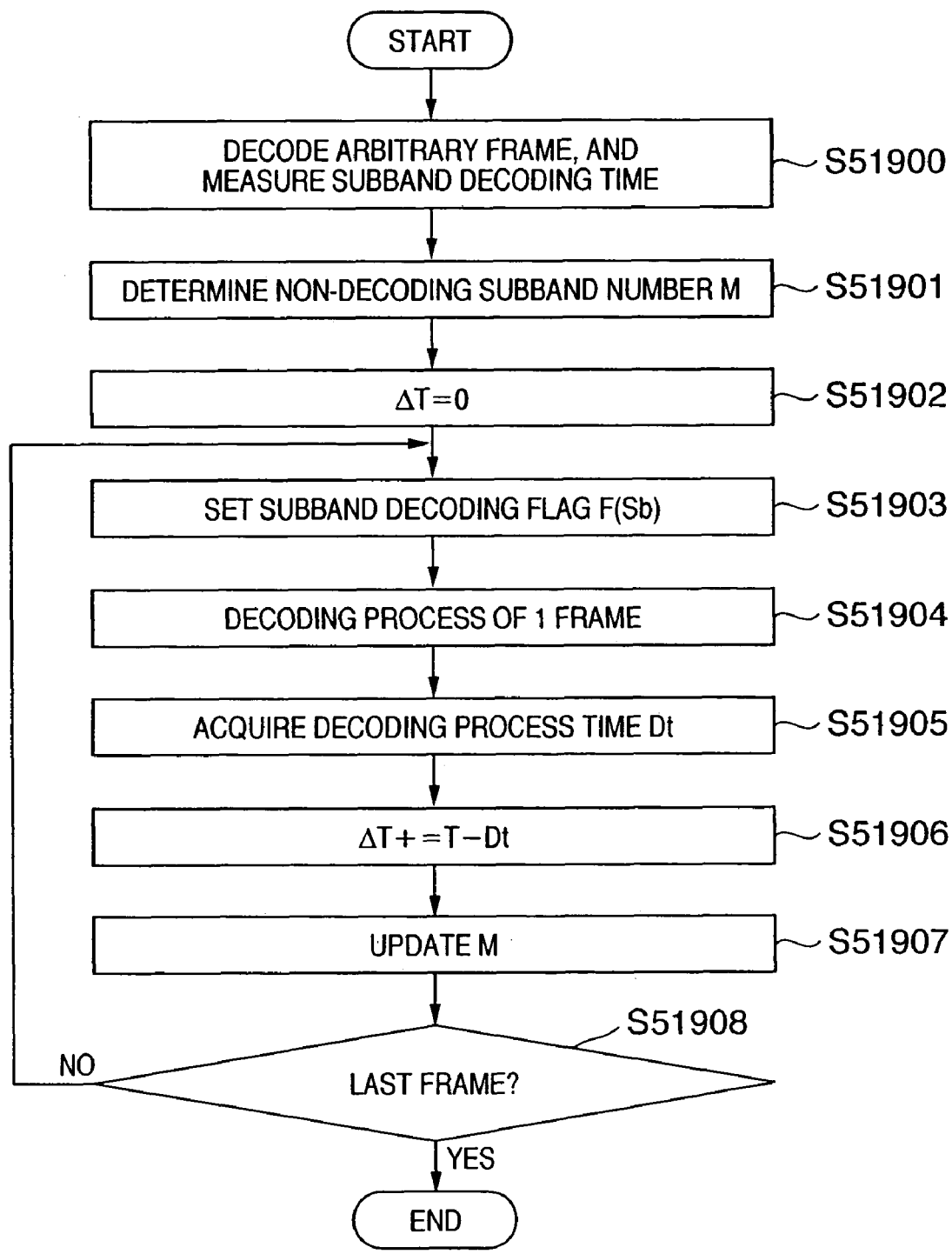
FIG. 24 is a flow chart showing the flow of the decoding process of encoded moving image data by the image decoding apparatus according to the fifth embodiment of the present invention.

FIG. 24 is a flow chart showing the flow of the encoded moving image data decoding process by the image decoding apparatus according to this embodiment. Note that a program according to FIG. 24 is loaded onto the RAM 51402, and the image decoding apparatus according to this embodiment can execute the process according to the flow chart shown in FIG. 24 when the CPU 51401 executes the loaded program. The image decoding process to be executed by the image decoding apparatus according to this embodiment will be described in more detail below with reference to the flow chart shown in FIG. 24.

Initially, the bitplane decoder 5102 and inverse discrete wavelet transformer 5104 decode encoded image data of the sample frame, which is read out from the secondary storage device 206 by the code sequence read unit 5101, and the decoding process time measurement unit 5106 measures decoding times Dt(SI) of subbands, which form the encoded image data of the sample frame, and a decoding process time Dt as a time required until all subbands which form the encoded image data of the sample frame are decoded and output (step S51900).

The non-decoding subband determination unit 5107 determines the non-decoding subband number M on the basis of the times measured in step S51900 (step S51901). If the actual decoding process time Dt≦the target decoding time T, since the decoding time for one frame falls within the target decoding process time even if all subbands that form each frame are decoded, M=0 (the non-decoding subband number=0, i.e., all subbands are to be decoded) is set.

On the other hand, if Dt>T, the time required until image data for one frame is reconstructed and output cannot fall within the target decoding process time if all subbands that form one frame are decoded. Hence, a process for setting a non-decoding subband in turn from that of a lower resolution of the subbands which form one frame is executed. In this manner, since the number of subbands to be decoded can be decreased, the time required until image data for one frame is reconstructed and output can fall within the target decoding process time.

More specifically, the non-decoding subbands M is decreased in the order from subband number 0 to subband number 6 until Dt≦T. More specifically, minimum M which satisfies:

$$Dt - \sum_{i=0}^{M-1} Dt(i) \leq T$$

is obtained, and is set as the non-decoding subband number M (step S51901).

With the above process, the non-decoding subband number M that may decode and output each frame within the target decoding process time is determined. Note that the above process determines the number of non-decoding subbands, i.e., the number of subbands which are not to be decoded. This process is equivalent to that for determining the number of subbands to be decoded.

Next, the decoding processes of encoded image data of respective frames are executed in turn from the first frame (frame 1 in this case). Prior to these processes, a time different ΔT is reset to zero (step S51902).

The non-decoding subband determination unit 5107 determines decoding flags F(Sb) on the basis of the non-decoding subband number M determined in step S51901 (step S51903). The process in step S51903 will be explained below taking the table of FIG. 23 as an example. For example, if M=3 is determined in step S51901, flags F(Sb) corresponding to Sb=HH2, LH2, and HL2, i.e., three flags F(Sb) in turn from the uppermost one are set to be zero, and other flags F(Sb) are set to be 1. The table data generated in this way is stored in the RAM 510402, as described above.

The code sequence read unit 5101 reads out encoded image data of respective frames from the secondary storage device 206, and outputs them to the next bitplane decoder 5102. The bitplane decoder 5102 decodes bitplanes of only subbands to be decoded in the encoded image data of each frame input from the code sequence read unit 5101 by looking up the F(Sb) table data. Furthermore, the inverse discrete wavelet transformer 5104 executes the inverse discrete wavelet transformation process using the decoding result, and outputs the decoded result of each frame, i.e., image data of each frame, to the moving image data output unit 5105 (step S51904).

The decoding process time measurement unit 5106 measures a time Dt required for a series of processes in step S51904 (i.e., a time required until image data for one frame is reconstructed and output in step S51904), and notifies the non-decoding subband determination unit 5107 of it (step S51905).

The non-decoding subband determination unit 5107 calculates the difference between the target decoding time T for one frame and the actually required decoding process time Dt, and adds it to the held time difference ΔT (step S51906). This time difference ΔT accumulates the "difference between the target decoding time T for one frame and the actually required decoding process time Dt" every time encoded image data for one frame is decoded.

Next, the non-decoding subband number M is updated according to the value ΔT (step S51907). That is, if ΔT is larger than a value Dt(M−1)×n, which is calculated and stored in the RAM 51402 in advance, 1 is subtracted from the value held by the variable M, i.e., the non-decoding subband number to decrease the value of the variable M.

Note that n is a predetermined arbitrary value, and the non-decoding subband number becomes harder to change as n assumes a larger value. ΔT becomes larger than a predetermined threshold value (Dt(M−1)×n in this embodiment) when the sum total of the actually required decoding times Dt (Dt×G (G is the number of times of the decoding process executed so far)) is smaller than the sum total of the target decoding process times T (T×G (G is the number of times of the decoding process executed so far)). In such case, it can be determined that there is a time margin for decoding some extra subbands.

Hence, the value of the non-decoding subband number M is decreased by 1 (i.e., the number of subbands to be decoded is increased by 1) to improve the decoded image quality. Note that the value to be subtracted from the non-decoding subband number is not limited to "1", and a value equal to or larger than "2" may be used depending on the threshold value used.

Note that Dt(M−1)×n used as the threshold value in this embodiment is a rough standard of the required decoding time of a subband which may become a new subband to be decoded since the non-decoding subband number M is decreased by 1.

Conversely, if ΔT is smaller than a value Lq (Lq<0) which is calculated and stored in advance in the RAM 51402, 1 is added to M to increase the value.

ΔT becomes smaller than a predetermined threshold value (Lq in this embodiment) when the sum total of the actually required decoding times Dt (Dt×G (G is the number of times of the decoding process executed so far)) is larger than the sum total of the target decoding process times T (T×G (G is the number of times of the decoding process executed so far)). In this case, it can be determined that the overall process delays.

Therefore, the non-decoding subband number is increased to shorten the decoding time per frame. Note that the value M ranges from 0 to 7, and if M<0 after the aforementioned update process, M=0; if M>7, M=7.

The processes in steps S51904 to S51908 are repeated for all frames (or frames designated using the keyboard 51402, mouse 51405, and the like) of the moving image. If the above processes have been done for all the frames, this process ends; otherwise, the flow returns to step S51904 to repeat the subsequent processes.

With the above process, the decoding process can be made by determining the number of subbands as decoding units.

As described above, the image decoding apparatus according to this embodiment can estimate the required decoding time of each subband, and determines the non-decoding subband number M on the basis of this required decoding time and the difference between the time required for the decoding process for one frame and the target decoding time, thus controlling the decoding process time while suppressing visual problems of a playback image as much as possible.

Sixth Embodiment

In the fifth embodiment, the required decoding time for each subband is estimated and the non-decoding subband number is determined so as to control the decoding time for one frame to fall within a predetermined time. That is, a subband is used as a decoding unit. In this embodiment, in order to achieve the same object as in the fifth embodiment, "bitplane" is used as this decoding unit, a parameter (to be referred to as a Q factor hereinafter) used to control the decoded image quality step by step is set, and the required decoding time based on each Q factor is estimated to determine the number of non-decoding bitplanes. In the image decoding apparatus of this embodiment, Q factors of 10 levels, i.e., those from 0 to 9, are specified, and the number of non-decoding bitplanes of each subband is determined for respective Q factors. An example of the Q factor will be explained later.

The image decoding apparatus of this embodiment decodes encoded image data that has undergone subband decomposition using a real number type 5×3 filter. That is, in the aforementioned moving image encoding apparatus, a signal for selecting the real number type 5×3 filter is input via the signal line 207 to encode moving image data. Also, identical quantization steps Delta(Sb) are used for all frames upon encoding frame images.

Furthermore, the basic arrangement of the image decoding apparatus according to this embodiment is the same as that of the fifth embodiment, i.e., the arrangement shown in FIG. 26.

The image decoding apparatus according to this embodiment comprises the functional arrangement shown in FIG. 10. As shown in FIG. 10, the image decoding apparatus according to this embodiment comprises a code sequence read unit 904, bitplane decoder 102, coefficient dequantizer 901, inverse discrete wavelet transformer 902, moving image data output unit 105, decoding process time measurement unit 106, and non-decoding bitplane determination unit 903. Note that the arrangement shown in FIG. 10 may be implemented by hardware. However, in this embodiment, the respective units shown in FIG. 10 are implemented by a program which makes a computer implement the functions of the respective units, and this program is loaded from the external storage device 51407 or storage medium driver 51408, or from the external device via the I/F 51409 onto the RAM 51402.

In FIG. 10, reference numeral 206 denotes a secondary storage device described above, from which encoded moving image data is input to this apparatus. Assume that this secondary storage device 206 corresponds to the external storage device 51407 or storage medium driver 51408, or the external device connected to this apparatus via the I/F 51409, and encoded moving image data is loaded onto the RAM 51402 from one of these devices. Note that this encoded moving image data is generated by the moving image encoding apparatus, as described above.

The process to be executed by the image decoding apparatus according to this embodiment will be described below with reference to FIG. 10.

The image decoding apparatus according to this embodiment initially extracts encoded image data of an arbitrary frame from the encoded moving image data to be decoded as a sample, decodes that data using various Q factor values, and measures decoding times according to the respective Q factor values.

In general, encoded moving image data is decoded for each frame in that data. The code sequence read unit 904 shown in FIG. 10 reads out encoded data of a frame of interest from the encoded moving image data stored in the secondary storage device 206, and stores it in the RAM 51402. The encoded data for respective frames are basically read out in turn like frame 1, frame 2, . . . , but this embodiment reads out encoded data of an arbitrary frame as a sample and stores it in the RAM 51402, so as to decode the encoded image data of that frame as the sample using various Q factor values and to measure decoding times according to the respective Q factor values before the decoding processes of respective frames. In the following description, assume that the 60th frame is used as this frame (to be referred to as a sample frame hereinafter) for the sake of simplicity, but the present invention is not limited to such specific frame.

Also, upon reading out encoded image data of a frame, the code sequence read unit 904 executes a process for referring to the header of this encoded image data, reading out a quantization step delta(Sb) of each subband from the header, and storing it in the RAM 51402.

The bitplane decoder 102 reads out the encoded data stored in the RAM 51402 in the order of subbands and executes the same process as in the fifth embodiment to decode quantized transform coefficient data Q(Sb, x, y). The process in the bitplane decoder 102 is opposite to that in the bitplane encoder 204 shown in FIG. 1.

In the fifth embodiment, the non-decoding subband determination unit 5107 determines data F(Sb) indicating if each subband is to be decoded, and the bitplane decoder 5102 switches decoding/non-decoding for each subband according to F(Sb) upon executing the bitplane decoding process of each frame.

In this embodiment, the non-decoding bitplane determination unit 903 determines a "non-decoding bitplane number ND(Sb)" indicating the number of lower bits which are not to undergo bitplane decoding for each subband. ND(Sb) is data indicating that decoding processes of bitplanes for lower ND(Sb) bits of subband Sb are to be skipped.

Therefore, the bitplane decoder 102 can skip bitplane decoding processes for lower ND(Sb) bits of subband Sb with reference to this data ND(Sb) upon executing the bitplane decoding process of each frame. A process for obtaining such ND(Sb) will be described later.

Note that ND(Sb)=0 is set for all subbands Sb of the sample frame which is to be decoded first by the image decoding apparatus of this embodiment, and bitplanes of all subbands are decoded. Assume that the ND(Sb) data for the sample frame are loaded in advance onto the RAM 51402.

The coefficient dequantizer 901 reclaims coefficients C(Sb, x, y) of each subband based on the quantization step delta(Sb) determined for each subband and the quantized coefficient values Q(Sb, x, y) decoded by the bitplane decoder 102.

The inverse discrete wavelet transformer 902 executes inverse transformation of the wavelet transformation process in the discrete wavelet transformer 202 in FIG. 1 to reclaim data of the frame. In this embodiment, since encoded moving image data generated using the real number type 5×3 filter for all the frames is to be decoded, inverse transformation corresponding to equations (3) and (4) above is done.

The moving image data output unit 105 outputs reconstructed image data output from the inverse discrete wavelet transformer 902 to an external device via the I/F 51409 or to the display device 51406. However, since the data of the sample frame which initially undergoes a plurality of decoding processes by the image decoding apparatus of this embodiment is to be decoded to estimate the decoding process time, each decoded frame data is discarded and is not output.

The decoding process time measurement unit 106 measures a decoding time for one frame required from the beginning of read of encoded image data for one frame by the code sequence read unit 904 from the secondary storage device 206 until the bitplane decoder 102, coefficient dequantizer 901, and inverse discrete wavelet transformer 902 execute a decoding process of the encoded image data for one frame and image data is output to the moving image data output unit 105. In this case, the unit 106 changes the Q factor value from 0 to 9, and measures decoding times for one frame in correspondence with respective cases. That is, the unit 106 measures a decoding time for one frame when the Q factor value is 0, that when the Q factor value is 1, . . . , and that when the Q factor value is 9.

In this embodiment, since the sample frame is to be decoded first, the decoding process time measurement unit 106 measures a decoding time of the sample frame when the Q factor value is 0, that when the Q factor value is 1, . . . , and that when the Q factor value is 9.

FIG. 20 shows decoding times Dt'(Q) of the sample frame corresponding to respective Q factor values. Fields Dt'(0) to Dt'(9) store the actually measured times. The decoding process time measurement unit 106 executes the process for measuring the respective decoding times to generate data of decoding times Dt'(Q) of the sample frame corresponding to the respective Q factor values, and stores them in the RAM 51402.

Upon completion of the process for obtaining data of decoding times Dt'(0) to Dt'(9) shown in FIG. 20, and storing them in the RAM 51402, the decoding process time measurement unit 106 then executes a process for calculating an increment Dt(Q) of the decoding process time with respect to a change in Q factor value.

More specifically, the unit 106 calculates Dt(Q) by:

$$Dt(Q)=Dt'(Q+1)-Dt'(Q) \tag{7}$$

for $0 \leq Q \leq 8$

The decoding process time measurement unit 106 stores calculated data Dt(0) to Dt(8) in the RAM 51402.

Also, the decoding process time measurement unit 106 measures a time required from the beginning of read of encoded image data for one frame by the code sequence read unit 904 from the secondary storage device 206 until the moving image data output unit 105 outputs reconstructed frame data as a "time required to decode encoded image data for one frame". Since this time is equivalent to Dt'(0) above, the unit 106 outputs this data to the non-decoding bitplane determination unit 903.

The decoding process time measurement unit 106 measures the time Dt (i.e., Dt'(Q)) for each of frames other than the first frame in the moving image, and outputs it to the non-decoding bitplane determination unit 903.

The non-decoding bitplane determination unit 903 executes a process for determining bitplanes which are not to be decoded of those of each subband which forms the encoded image data for one frame, so that the decoding process time Dt of the sample frame output from the decoding process time measurement unit 106 becomes equal to or smaller than a value pre-stored in the RAM 51402 as an upper limit value of the time required to reclaim and output image data for one frame.

Assume that the RAM 51402 holds, before this process, data of a variable Q used as an index, a variable T indicating the target decoding process time as the upper limit value of the decoding time for one frame, a variable ΔT indicating the time difference, and a table registered with the non-decoding bitplane numbers of respective subbands according to the Q factor values.

FIG. 8 shows an example of the configuration of the table registered with the non-decoding bitplane numbers of respective subbands according to the Q factor values. The table shown in FIG. 8 is prepared in advance and is stored in the RAM 51402. As can be seen with reference to the table shown in FIG. 8, for example, when "4" is used as the Q factor value, ND(Sb)=4 for subbands Sb=HH2, HL2, and HL2 (LH2), i.e., decoding processes of bitplanes for lower 4 bits are to be skipped; ND(Sb)=3 for subband Sb=HL1 (LH1), i.e., decoding processes of bitplanes for lower 3 bits are to be skipped; and ND(Sb)=1 for subband Sb=LL, i.e., a decoding process of a bitplane for lower 1 bit is to be skipped.

Hence, in the process to be described below, the Q factor value is obtained, and the number of non-decoding bitplanes for each subband is obtained according to the obtained Q factor value.

Figure 25:
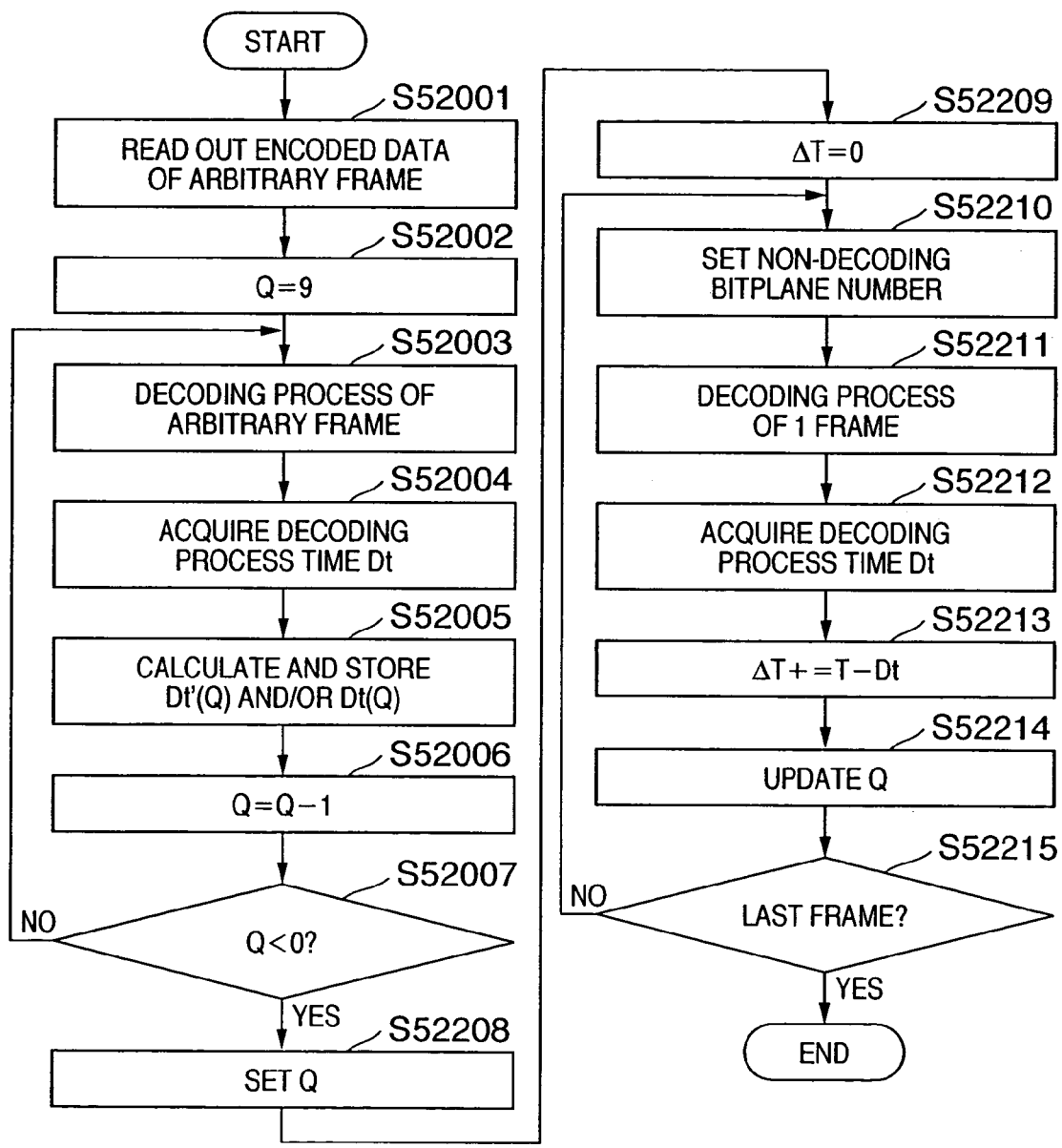
FIG. 25 is a flow chart showing the flow of the decoding process of encoded moving image data by the image decoding apparatus according to the sixth embodiment of the present invention.

FIG. 25 is a flow chart showing the flow of the encoded moving image data decoding process by the image decoding apparatus according to this embodiment. Note that a program according to FIG. 25 is loaded onto the RAM 51402, and the image decoding apparatus according to this embodiment can execute the process according to the flow chart shown in FIG. 25 when the CPU 51401 executes the loaded program. The image decoding process to be executed by the image decoding apparatus according to this embodiment will be described in more detail below with reference to the flow chart shown in FIG. 25.

The code sequence read unit 904 reads out encoded image data of the sample frame from the secondary storage device 206 (step S52001). The decoding process time measurement unit 106 resets the variable Q by substituting a value 9 in it (step S52002). The decoding process time measurement unit 106 repeats processes in steps S52003 to S52006 to be described below until the variable Q assumes a negative value.

The bitplane decoder 102, coefficient dequantizer 901, and inverse discrete wavelet transformer 902 decode the encoded image data of the sample frame, which is read out by the code sequence read unit 904 in step S52001 (step S52003). This decoding process corresponds to that when the Q factor value (a value held by the variable Q) is 9.

The decoding process time measurement unit 106 measures a time required for the process in step S52003 (step S52004). At this time, since the value of the variable Q is "9", the time measured in step S52004 corresponds to Dt'(9) above. The decoding process time measurement unit 106 stores data of Dt'(9) measured in step S52004 in the RAM 51402 (step S52005).

The decoding process time measurement unit 106 executes a process for substituting a difference obtained by subtracting 1 from the value held by the variable Q in the variable Q again (step S52006). After the process in step S52006, the value held by the variable Q is "8".

The decoding process time measurement unit 106 checks if the value held by the variable Q is negative (step S52007). If the value held by the variable Q is not negative, the flow returns to step S52003 to repeat the above processes. In this case, since the value held by the variable Q is "8", and 8>0, the flow returns to step S52003.

A decoding process for Q=8 is executed in step S52003, and a decoding time required for that process is measured in step S52004. At this time, since the value of the variable Q is "8", the time measured in step S52004 corresponds to Dt'(8) above.

In step S52005, a process for calculating an increment Dt(Q) of the decoding process time with respect to a change in Q factor value is executed according to equation (7) above. This process for calculating the increment is done according to equation (7) by:

$$Dt(8)=Dt'(9)-Dt'(8) \quad (8)$$

That is, Dt(8) is calculated using Dt'(8) measured in the current step S52004 and Dt'(9) measured in the previous step S52004. The same applies to all cases when Q<9. In general, Dt(Q) is calculated using Dt'(Q) measured in the current step S52004 and Dt'(Q+1) measured in the previous step S52004.

More specifically, in step S52005 if Q=9, data of Dt'(9) is stored in the RAM 51402 without calculating the increment Dt(Q); if Q<9, the increment Dt(Q) is calculated according to equation (7).

The processes in steps S52003 to S52006 are repeated until Q<0. When Q<0, Dt(0) to Dt(8) are obtained, and the non-decoding bitplane determination unit 903 obtains the Q factor value used to decode respective frames of moving image data using these Dt(0) to Dt(8) (step S52208).

If Dt'(0) measured in step S52004 when Q=0 and the target decoding process time T meet Dt'(0)≦T, since the decoding time for one frame falls within the target decoding process time even when all bitplanes of all subbands which form each frame are decoded, Q=0 (the non-decoding bitplane number=0, i.e., all bitplanes are to be decoded) is set.

On the other hand, if Dt'(0)>T, the time required until image data for one frame is reconstructed and output cannot fall within the target decoding process time if all bitplanes of all subbands that form one frame are decoded. Hence, the Q factor value that allows the time required until image data for one frame to fall within the target decoding process time is obtained, and bitplanes other than non-decoding bitplanes specified by the obtained Q factor value are decoded with reference to the table shown in FIG. 8, thus controlling the time required until image data for one frame to fall within the target decoding process time.

More specifically, minimum Q which satisfies:

$$Dt - \sum_{i=0}^{Q-1} Dt(i) \leq T$$

is calculated, and is set as the Q factor value to be used in the subsequent processes.

With the above process, the Q factor value required to decode and output each frame within the target decoding process time can be obtained.

Next, the decoding processes of encoded image data of respective frames are executed in turn from the first frame (frame 1 in this case). Prior to these processes, a time difference ΔT is reset to zero (step S52209).

The non-decoding bitplane determination unit 903 determines the non-decoding bitplane number on the basis of the Q factor value obtained in step S52208 (step S52210). As described above, this process is done by acquiring the number of non-decoding bitplanes of each subband according to the value Q obtained in step S52208 with reference to the data of the table shown in, e.g., FIG. 8.

Note that the process in step S52210 determines the number of non-decoding bitplanes, i.e., the number of bitplanes which are not to be decoded. In other words, this process is equivalent to that for determining the number of bitplanes to be decoded. The determined number of non-decoding bitplanes for each subband is stored in the RAM 51402 as the data ND(Sb).

The code sequence read unit 904 reads out encoded image data of respective frames from the secondary storage device 206, and outputs them to the next bitplane decoder 102. The bitplane decoder 5102 decodes only bitplanes to be decoded of each subband in the encoded image data of each frame input from the code sequence read unit 904 with reference to the data ND(Sb). Furthermore, the inverse discrete wavelet transformer 902 executes the inverse discrete wavelet transformation process using the decoding result, and outputs the decoded result of each frame, i.e., image data of each frame, to the moving image data output unit 105 (step S52211).

The decoding process time measurement unit 106 measures a time Dt required for a series of processes in step S52211 (i.e., a time required until image data for one frame is reconstructed and output in step S52211), and notifies the non-decoding bitplane determination unit 903 of it (step S52212).

The non-decoding bitplane determination unit 903 calculates the difference between the target decoding time T for one frame and the actually required decoding process time Dt, and adds it to the held time difference ΔT (step S52213). This time difference ΔT accumulates the "difference between the target decoding time T for one frame and the actually required decoding process time Dt" every time encoded image data for one frame is decoded.

The Q factor value (the value held by the variable Q) is updated according to the value ΔT (step S52214). That is, if ΔT is larger than a value Dt(Q−1)×n, which is calculated and stored in the RAM 51402 in advance, 1 is subtracted from the value held by the variable Q to decrease the value of the variable Q.

Note that n is a predetermined arbitrary value, and the Q factor value becomes harder to change as n assumes a larger value. ΔT becomes larger than a predetermined threshold value (Dt(Q−1)×n in this embodiment) when the sum total of the actually required decoding times Dt (Dt×G (G is the number of times of the decoding process executed so far)) is smaller than the sum total of the target decoding process times T (T×G (G is the number of times of the decoding process executed so far)). In such case, it can be determined that there is a time margin for decoding some extra bitplanes.

Hence, the value of the Q factor value is decreased by 1 (i.e., the number of non-decoding bitplanes is increased by 1 on the basis of the table in FIG. 8) to improve the decoded image quality. Note that the value to be subtracted from the Q factor value is not limited to "1", and a value equal to or larger than "2" may be used depending on the threshold value used.

Conversely, if ΔT is smaller than a value Lq (Lq<0) which is calculated and stored in advance in the RAM 51402, 1 is added to the value held by Q to increase the value.

ΔT becomes smaller than a predetermined threshold value (Lq in this embodiment) when the sum total of the actually required decoding times Dt (Dt×G (G is the number of times of the decoding process executed so far)) is larger than the sum total of the target decoding process times T (T×G (G is the number of times of the decoding process executed so far)). In this case, it can be determined that the overall process delays.

Therefore, the Q factor value is increased to shorten the decoding time per frame, thus increasing the number of non-decoding bitplanes. Note that the value Q ranges from 0 to 9, and if Q<0 after the aforementioned update process, Q=0; if Q>9, Q=9.

The processes in steps S52210 to S52214 are repeated for all frames (or frames designated using the keyboard 51402, mouse 51405, and the like) of the moving image. If the above processes have been done for all the frames, this process ends; otherwise, the flow returns to step S52210 to repeat the subsequent processes.

With the above process, the decoding process can be made by determining the number of bitplanes as decoding units.

As described above, the image decoding apparatus according to this embodiment decodes the sample frame by changing an image quality parameter to estimate required decoding times corresponding to the changed image quality parameter values, and determines the image quality parameter to be used on the basis of the required decoding times and the difference between the time required for the decoding process of one frame and the target decoding time, thus controlling the decoding process time while suppressing visual problems of a playback image as much as possible.

<Modification>

For example, in the fifth and sixth embodiments, bitplane encoding is done for respective subbands. Alternatively, each subband may be segmented into blocks, and bitplane encoding may be made for respective blocks. Also, one bitplane may be encoded using a plurality of passes.

The fifth embodiment uses subbands and the sixth embodiment uses bitplanes as decoding units. In addition, code blocks may be used, and the present invention is not limited to such specific decoding units in the fifth and sixth embodiments.

In the example described in the fifth and sixth embodiments, MQ-Coder is used as the binary arithmetic encoding method. However, the present invention is not limited to such specific method. For example, arithmetic encoding methods other than MQ-Coder such as QM-Coder and the like may be adopted, and other binary encoding methods may be adopted as long as they are suited to encode a multi-context information source.

The filters for subband decomposition are not limited to those in the fifth and sixth embodiments. For example other filters such as a real number type 9×7 filter and the like may be used. Furthermore, the number of times of application of the filter is not limited to that in the fifth and sixth embodiments. In the fifth and sixth embodiments, linear discrete wavelet transformation is applied the same number of times in the horizontal and vertical directions, but need not always be applied the same number of times in the horizontal and vertical directions.

Moreover, the structure of the encoded moving image data is not limited to the fifth and sixth embodiments. For example, the order of the code sequence, the storage format of additional information, and the like may be modified. For example, the present invention is suitable for use of JPEG2000 specified by ISO/IEC15444-1 as the frame data encoding method, and encoded data described in the JPEG2000 standard or that of Motion JPEG2000 specified by the JPEG2000 standard Part 3 may be used.

In the fifth and sixth embodiments, one arbitrary frame is decoded to estimate the process time prior to the decoding process. Alternatively, the decoding process time may be estimated using a plurality of frames as samples, or the estimated decoding process time may be updated during actual decoding processes.

Other Embodiments

Note that the present invention may be applied to either a system constituted by a plurality of devices (e.g., a host computer, interface device, reader, printer, and the like), or an apparatus consisting of a single equipment (e.g., a copying machine, facsimile apparatus, or the like). Also, techniques described in the respective embodiments may be combined.

The objects of the present invention are also achieved by supplying a recording medium (or storage medium), which records a program code of a software program that can implement the functions of the above-mentioned embodiments to the system or apparatus, and reading out and executing the program code stored in the recording medium by a computer (or a CPU or MPU) of the system or apparatus. In this case, the program code itself read out from the recording medium implements the functions of the above-mentioned embodiments, and the recording medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the recording medium is written in a memory of the extension card or unit. When the present invention is applied to the recording medium, that recording medium stores the program codes corresponding to the aforementioned flow charts.

When the present invention is applied to the recording medium, that recording medium stores program codes corresponding to the aforementioned flow charts.

As many apparently widely different embodiments of the present invention can be made without departing from the spirit and scope thereof, it is to be understood that the invention is not limited to the specific embodiments thereof except as defined in the claims.

What is claimed is:

1. A moving image decoding method of decoding encoded moving image data, which is generated by decomposing each frame of moving image data into a plurality of subbands, and encoding a plurality of coefficients for each subband from upper to lower bits for respective bitplanes or sub-bitplanes using the bitplane encoding method in JPEG2000 for a predetermined unit, using a computer to perform the steps of:

a calculation step of, for every decoding of a video frame, calculating a time difference $\Delta T$ between a decoding process time DT taken in a decoding process of the video frame and a target decoding time T for the decoding process and adding the calculated time difference $\Delta T$ to an accumulated time difference TT to update the accumulated time difference TT;

a non-decoding pass determination step of determining passes that are not to be decoded based on the updated accumulated time difference TT;

a pass decoding step of reclaiming the plurality of coefficients of the plurality of subbands from encoded data of passes other than the passes determined in the non-decoding pass determination step; and a subband composition step of generating frame data by compositing the coefficients of the plurality of subbands reclaimed in the pass decoding step, wherein the non-decoding pass determination step includes steps of:

managing a table that represents a correspondence between an index Q and a non-decoding pass number NDP(Sb) of a subband Sb, deciding a value of the index Q in accordance with the updated accumulated time difference TT;

selecting the number NDP(Sb) for each subband Sb uniquely defined by the decided value of the index Q from the table, and setting lower passes for each subband Sb, the number of which is the selected NDP(Sb), as the passes that are not to be decoded.

2. The method according to claim 1, wherein subband decomposition for generating the encoded moving image data is attained by two-dimensional discrete wavelet transformation, and the subband composition step includes a step of compositing the frame data using two-dimensional inverse discrete wavelet transformation.

3. The method according to claim 1, wherein the predetermined unit is a frame or a block obtained by segmenting a frame into a plurality of blocks.

4. The method according to claim 1, wherein the value of the index Q is decided to be decreased, when the accumulated time difference TT is larger than a first threshold, and the value of the index Q is decided to be increased, when the accumulated time difference TT is smaller than a second threshold.

5. A moving image decoding apparatus for decoding encoded moving image data, which is generated by decomposing each frame of moving image data into a plurality of subbands, and encoding a plurality of coefficients for each subband from upper to lower bits for respective bitplanes or sub-bitplanes using the bitplane encoding method in JPEG2000 for a predetermined unit, said apparatus comprising:

hardware means, including at least one processor configured to perform as:

a calculation unit operable to calculate, every decoding a video frame, a time difference $\Delta T$ between a decoding process time DT taken in a decoding process of the video frame and a target decoding time T for the decoding process and adding the calculated time difference $\Delta T$ to an accumulated time difference TT to update the accumulated time difference TT;

a non-decoding pass determination unit operable to determine passes that are not to be decoded based on the updated accumulated time difference TT;

a pass decoding unit operable to reclaim the plurality of coefficients of the plurality of subbands from encoded data of passes other than the passes determined by said non-decoding pass determination unit; and a subband composition unit operable to generate frame data by compositing the coefficients of the plurality of subbands reclaimed by said pass decoding unit, wherein the non-decoding pass determination unit is further operable to:

manage a table that represents a correspondence between an index Q and a non-decoding pass number NDP(Sb) of a subband Sb, decide a value of the index Q in accordance with a value of the updated accumulated difference time TT;

select the number NDP(Sb) for each subband Sb uniquely defined by the decided value of the index Q from the table, and set lower passes for each subband Sb, the number of which is the selected NDP(Sb), as the passes that are not to be decoded.

6. A non-transitory computer-readable medium, storing a program, in executable form, for causing an information processing apparatus to perform a moving image decoding method according to claim 1.

* * * * *